(12) United States Patent
     Horishita

(10) Patent No.: US 10,708,467 B2
(45) Date of Patent: Jul. 7, 2020

(54) INFORMATION PROCESSING APPARATUS THAT PERFORMS AUTHENTICATION PROCESSING FOR APPROACHING PERSON, AND CONTROL METHOD THEREOF

(71) Applicant: CANON KABUSHIKI KAISHA, Tokyo (JP)

(72) Inventor: Yusuke Horishita, Nagareyama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/131,364

(22) Filed: Sep. 14, 2018

(65) Prior Publication Data

US 2019/0089866 A1    Mar. 21, 2019

(30) Foreign Application Priority Data

Sep. 20, 2017   (JP) ................. 2017-180189

(51) Int. Cl.
    *G06K 15/00*      (2006.01)
    *H04N 1/44*       (2006.01)
    *H04N 1/00*       (2006.01)

(52) U.S. Cl.
    CPC ......... *H04N 1/442* (2013.01); *H04N 1/00251* (2013.01); *H04N 1/00336* (2013.01)

(58) Field of Classification Search
    None
    See application file for complete search history.

(56) References Cited

U.S. PATENT DOCUMENTS

| | | | |
|---|---|---|---|
| 7,646,501 B2 * | 1/2010 | Ikeda | G06F 3/1222 358/1.14 |
| 8,760,681 B2 * | 6/2014 | Kato | H04N 1/00482 358/1.13 |
| 2016/0352926 A1 * | 12/2016 | Ueta | H04N 1/00352 |
| 2017/0039010 A1 * | 2/2017 | Nobutani | G06F 21/32 |
| 2017/0041503 A1 * | 2/2017 | Nobutani | H04N 1/442 |

FOREIGN PATENT DOCUMENTS

JP        2017033358 A    2/2017

* cited by examiner

*Primary Examiner* — Henok Shiferaw
(74) *Attorney, Agent, or Firm* — Rossi, Kimms & McDowell LLP

(57) ABSTRACT

An information processing apparatus aims to prevent erroneous determination of the user and lowering convenience of the user. The information processing apparatus includes an imaging unit configured to pick up a surrounding image, an authenticating unit configured to execute authentication processing of a person included in the picked up surrounding image, an acquiring unit configured to acquire the number of people included in the picked up surrounding image, a permitting unit configured to permit execution of the authentication processing when an authentication permission condition is satisfied for a person included in the picked up surrounding image, and a changing unit configured to change the authentication permission condition in accordance with the acquired number of people.

13 Claims, 17 Drawing Sheets

INFORMATION PROCESSING APPARATUS THAT PERFORMS AUTHENTICATION PROCESSING FOR APPROACHING PERSON, AND CONTROL METHOD THEREOF

BACKGROUND OF THE INVENTION

Field of the Invention

The present invention relates to an information processing apparatus that performs authentication processing for an approaching person, and a control method thereof.

Description of the Related Art

An information processing apparatus that performs authentication processing for the user, for example, an image forming apparatus, includes a camera disposed toward a direction in which the user approaches, and performs authentication processing based on a face image of the user picked up by the camera. Such an image forming apparatus can start authentication processing without waiting for a password and the like manually input by the user. Accordingly, by the time the user arrives at the image forming apparatus, authentication processing has been finished, and there is an advantage that the user can use the image forming apparatus immediately.

There is a case where there is a plurality of people in the vicinity of the image forming apparatus, and an image picked up by the camera includes a plurality of people. In this case, there has been proposed a technique of determining a person who has high possibility of using the image forming apparatus as the user, and performing authentication processing by using a face image of the user (for example, refer to Japanese Laid-Open Patent Publication (kokai) No. 2017-33358). Specifically, a person who is extremely close to the image forming apparatus or a person approaching the image forming apparatus is determined as the user, and a face image of the user is used to perform face authentication processing. However, according to an image forming apparatus of Japanese Laid-Open Patent Publication (kokai) No. 2017-33358), the user is determined among a plurality of people. For this reason, there is possibility that a person who does not have an intention of using the image forming apparatus is erroneously determined as the user. In view of the above, it is considered that the above erroneous determination is prevented by narrowing down an imaging range of the camera, and reducing possibility of including a plurality of people in an image picked up by the camera.

However, when an imaging range of the camera is narrowed down, authentication processing using a face image of a user is started after the user approaches the image forming apparatus very closely. For this reason, there is possibility that the authentication processing has not been finished yet by the time the user arrives at the image forming apparatus. That is, there has been a problem that the user cannot use the image forming apparatus immediately after arriving at the image forming apparatus, which leads to lowering convenience of the user.

SUMMARY OF THE INVENTION

The present invention provides an information processing apparatus that can prevent erroneous determination of the user and lowering convenience of the user, a control method thereof, and a program.

Accordingly, the present invention provides an information processing apparatus, comprising: an imaging unit configured to pick up a surrounding image; an authenticating unit configured to execute authentication processing of a person included in the picked up surrounding image; an acquiring unit configured to acquire the number of people included in the picked up surrounding image; a permitting unit configured to permit execution of the authentication processing when an authentication permission condition is satisfied for a person included in the picked up surrounding image; and a changing unit configured to change the authentication permission condition in accordance with the acquired number of people.

According to the present invention, erroneous determination of the user and lowering convenience of the user can be prevented.

Further features of the present invention will become apparent from the following description of exemplary embodiments with reference to the attached drawings.

DESCRIPTION OF THE EMBODIMENTS

Hereinafter, embodiments of the present invention will be described in detail with reference to the accompanying drawings. However, configurations described in the embodiments described below are mere exemplifications, and the scope of the present invention is not limited by the configurations described in the embodiments. First, a first embodiment of the present invention will be described.

Figure 1:
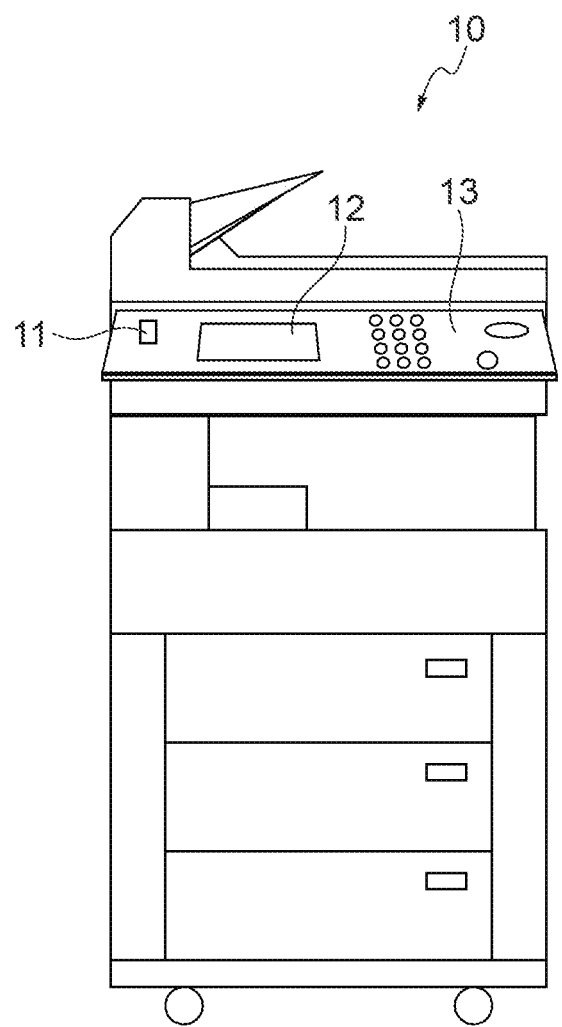
FIG. 1 is an external view showing an image forming apparatus as an information processing apparatus according to a first embodiment of the present invention.

FIG. 1 is an external view showing an image forming apparatus as an information processing apparatus according to a first embodiment of the present invention. In FIG. 1, an image forming apparatus 10 includes a camera 11 that picks up an image around the image forming apparatus 10, a display part 12 configured with an LCD, an LED, and the like, and an input part 13 configured with a touch panel, a hardware key, and the like. The camera 11, the display part 12, and the input part 13 are oriented to the same direction in the image forming apparatus 10. For example, in a front view of the image forming apparatus 10, the camera 11 is disposed in an upper left direction of the display part 12, and picks up the user operating the input part 13. A fisheye lens may be used for the camera 11. In this manner, a wider angle image can be picked up as compared with a case where a general lens is used. The image forming apparatus 10 includes a plurality of functions, such as a print function, a scanner function, a copy function, and a FAX function.

Figure 2:
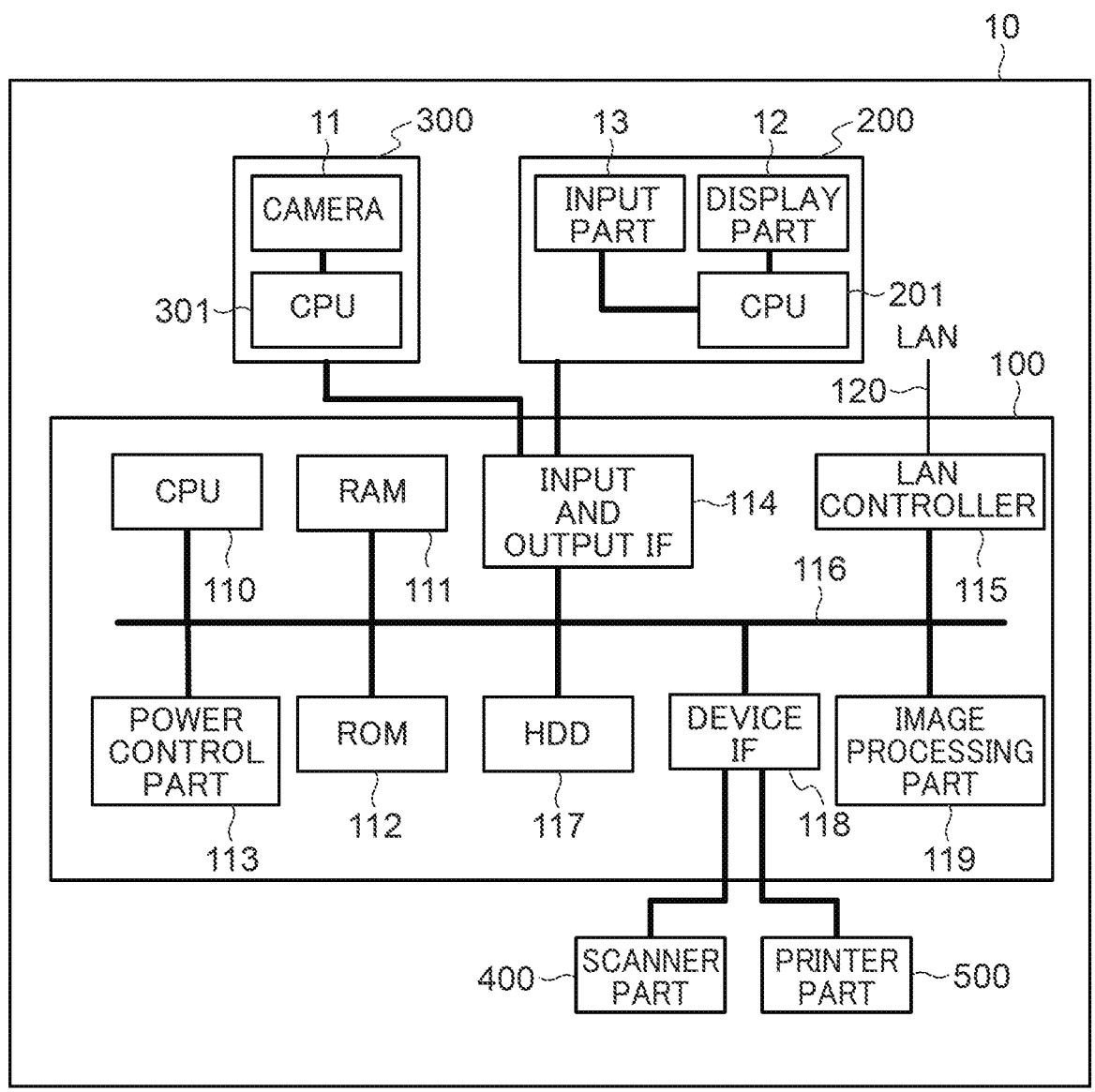
FIG. 2 is a block diagram schematically showing an internal configuration of the image forming apparatus.

FIG. 2 is a block diagram schematically showing an internal configuration of the image forming apparatus 10 of FIG. 1. In FIG. 2, the image forming apparatus 10 includes a controller 100, an operation part 200, a detection part 300, a scanner part 400, and a printer part 500. The controller 100 can communicate with the operation part 200, the detection part 300, the scanner part 400, and the printer part 500. The controller 100 controls operation of the image forming apparatusimage forming apparatus 10. The operation part 200 accepts operation of the image forming apparatusimage forming apparatus 10 performed by the user, and performs input and output of information between the image forming apparatusimage forming apparatus 10 and the user. The detection part 300 executes a person detection function (hereinafter referred to as a "human detection sensor function") and a person's face authentication function (hereinafter simply referred to as a "face authentication function"). The scanner part 400 optically read an image from a document to generate image data. The printer part 500 forms an image on a recording medium (paper) in accordance with an electrophotographic system.

In the image forming apparatusimage forming apparatus 10, the controller 100 includes a CPU 110, a RAM 111, a ROM 112, a power control part 113, an input and output I/F 114, a LAN controller 115, an HDD 117, a device I/F 118, and an image processing part 119. The constituents of the controller 100 are connected to each other through a system bus 116. The CPU 110 performs overall control of accesses to the scanner part 400 and the printer part 500 connected to the controller 100 based on a control program and the like stored in the ROM 112, and also performs overall control of a variety of types of processing executed by the controller 100. The CPU 110 performs communication with the operation part 200 and the detection part 300 through the input and output IT 114. The CPU 110 also performs communication with the scanner part 400 and the printer part 500 through the device OF 118. The CPU 110 switches a power mode of the image forming apparatusimage forming apparatus 10 from a standby mode to a sleep mode by using the power control part 113 when the image forming apparatusimage forming apparatus 10 is not used for a predetermined period of time, such as when the operation part 200 is not operated over a certain period of time. It should be noted that the standby mode is a state in which reading operation of the scanner part 400 and printing operation of the printer part 500 can be executed immediately. The sleep mode is a power-saving state in which power consumption is smaller than that in the standby mode, and is a state in which power supplied to the scanner part 400 and the printer part 500 is limited, and reading operation and printing operation cannot be executed immediately. In the sleep mode, power is supplied only to minimum constituents necessary for returning from the power-saving state, for example, the LAN controller 115, the power control part 113, the CPU 201, and the detection part 300. The RAM 111 is a system work memory for operating the CPU 110, and also functions as a memory that temporarily stores image data. The ROM 112 stores a boot program and the like of the image forming apparatusimage forming apparatus 10. The power control part 113 is a block that controls power of the image forming apparatusimage forming apparatus 10, and controls power in accordance with an instruction from the CPU 110 and operation of a power-saving button performed by the user. The power control part 113 detects power-off operation performed by using a power switch, and notifies the CPU 110 of a power-off request in accordance with the detected power-off operation. The CPU 110 switches the image forming apparatusimage forming apparatus 10 to a state in which the image forming apparatusimage forming apparatus 10 can be turned off in accordance with receiving of a power-off request, and instructs the power control part 113 to stop power. The LAN controller 115 transmits and receives information to and from an external device, such as a PC (not shown), connected to the LAN 120. The HDD 117 is a hard disk drive, and stores system software and image data. The image processing part 119 reads out image data temporarily stored in the RAM 111, and applies image processing, such as enlarging or reducing size, and color adjustment, to the image data.

The operation part 200 includes the CPU 201, the display part 12, and the input part 13 described above. It should be noted that the operation part 200 may include an interface for performing a short-range radio communication with a mobile terminal, for example, an NFC reader and writer and a Bluetooth (registered trademark) module. The detection part 300 includes a CPU 301 and the camera 11 described above. The CPU 301 starts or stops execution of a human detection sensor function or a face authentication function and controls supply of power to the camera 11 in accordance with an on or off request from the CPU 110. The operation part 200 and the detection part 300 work together to display an image picked up by the camera 11 on the display part 12. Specifically, the CPU 301 first acquires an image picked up by the camera 11 at intervals of a certain period of time, and stores image data in a RAM (not shown) incorporated in the CPU 301. Next, the CPU 301 transmits the image data that has already been stored in the internal RAM to the controller 100. The CPU 110 stores the received image data in the RAM 111, and also combines the received image data with another piece of image data, such as a message, and transmits the combined image data to the operation part 200. The operation part 200 displays the transmitted image data on the display part 12. It should be noted that, then size of the image data is large as compared to capacity of the internal RAM of the CPU 301, a new storage region, such as an external SDRAM, may be provided in the detection part 300 so that the image data can be stored in the storage region. The operation part 200 and the detection part 300 have their own CPUs 201 and 301. The configuration may also be such that one CPU is shared by the operation part 200 and the detection part 300, and the CPU controls the operation part 200 and the detection part 300.

Figure 3:
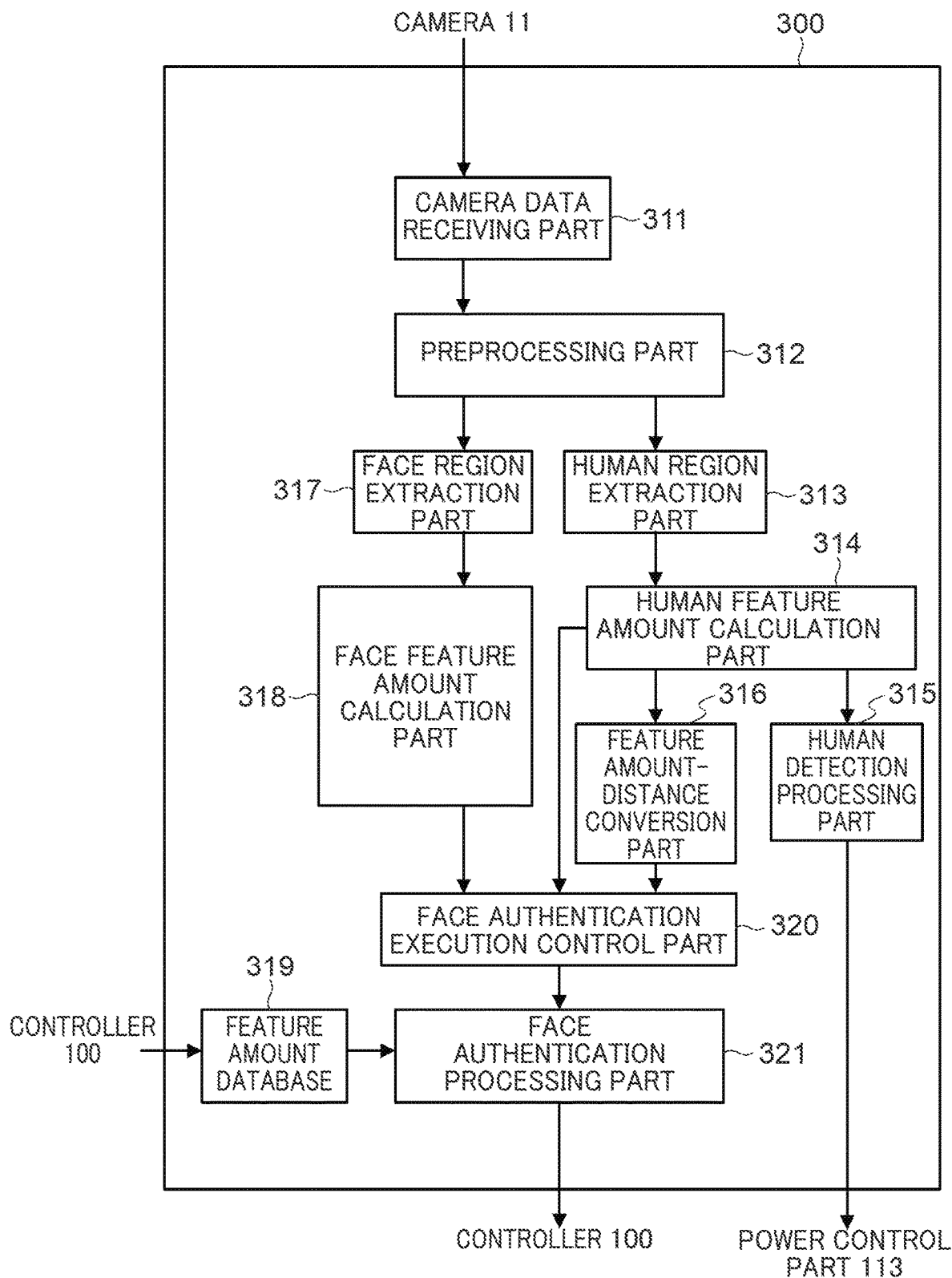
FIG. 3 is a view which is useful in explaining a configuration and data flow of a program corresponding to a face authentication function executed by a CPU of a detection part.

FIG. 3 is a view which is useful in explaining a configuration and data flow of a program corresponding to a face authentication function executed by the CPU 301 of the detection part 300. Arrows in FIG. 3 show flow of data, such as image data. In FIG. 3, the detection part 300 includes, as modules for executing a program, a camera data receiving part 311, a preprocessing part 312, a human region extraction part 313, a human feature amount calculation part 314, a human detection processing part 315, and a feature amount-distance conversion part 316. The detection part 300 includes, as the modules described above, a face region extraction part 317, a face feature amount calculation part 318, a feature amount database 319, a face authentication execution control part 320, and a face authentication processing part 321.

The camera data receiving part 311 receives image data from the camera 11 and stores the image data in the internal RAM of the CPU 301. The image data received here is a picked-up image of an imaging region A1 which is a region that can be picked up by the camera 11. The preprocessing part 312 applies image processing, such as contrast correction, color/monochrome conversion, and enlarging/reduction in size, to the image data stored in the internal RAM to convert the image data to image data that can be handled by processing parts on a downstream side. It should be noted that, when a fisheye lens is used for the camera 11, a picked-up image is distorted. Accordingly, the preprocessing part 312 performs image processing, such as distortion correction. The human region extraction part 313 executes a background differencing technique, which is a general moving body detection method, to extract a region (human region) occupied by a person that exists in a forward direction (on a front side) of the image forming apparatusimage forming apparatus 10 in a picked-up image from the image data. When a plurality of people exists in the imaging region A1, a human region is extracted for each person. It should be noted that an extraction method of a human region performed by the human region extraction part 313 is not limited to the background differencing technique. For example, graph cut, which is a method of image segmentation, or machine learning may be used. The human feature amount calculation part 314 counts the number of human regions extracted by the human region extraction part 313 to acquire the number of people that exist in the imaging region A1. The human feature amount calculation part 314 calculates and acquires a barycentric position in an x direction (horizontal direction) and a y direction (vertical direction), an area, a height, a width, and the like (feature amounts) in a picked-up image for a person of each human region.

The human detection processing part 315 refers to an area of each person calculated by the human feature amount calculation part 314 to select a person of a human region having a largest area as a target (target person) for human detection processing. The human detection processing part 315 refers to a feature amount of the target person acquired by the human feature amount calculation part 314, and determines that the target person is the user who has high possibility of using the image forming apparatusimage forming apparatus 10 when the area is larger than a threshold value set in advance. The human detection processing part 315 transmits the determination result to the power control part 113, and, in accordance with the determination result, the power control part 113 changes a power mode of the image forming apparatusimage forming apparatus 10 from the sleep mode to the standby mode. The feature amount-distance conversion part 316 refers to a feature amount of each person acquired by the human feature amount calculation part 314, and calculates and acquires a distance (hereinafter referred to as a "person distance") from each person to the image forming apparatusimage forming apparatus 10. The face region extraction part 317 executes a face detection algorithm using a Haar-like feature amount and the like, which is a method of a face detection algorithm, to extract a region of a face (face region) of each person from image data. It should be noted that an extraction method of a face region executed by the face region extraction part 317 is not limited to the face detection algorithm described above, and, for example, deep learning may be used.

The face feature amount calculation part 318 calculates and acquires a feature amount (hereinafter referred to as a "face feature amount") relating to the face region extracted by the face region extraction part 317. In the present embodiment, for example, an area of a face of each person, a barycentric position of a face, a positional relationship between an eye, a nose, and a mouth are calculated and acquired. Feature amounts calculated by the face feature amount calculation part 318 are not limited to the above, and the face feature amount calculation part 318 may acquire a direction of a face, a line of sight, and the like. The feature amount database 319 includes a face feature amount of each person necessary for authenticating an individual by face authentication in advance. In the present embodiment, the feature amount database 319 is stored in a RAM (not shown) in the CPU 301. A database similar to the feature amount database 319 is stored in the HDD 117 of the controller 100. In the image forming apparatusimage forming apparatus 10, all or part of face feature amounts of each person included in the feature amount database 319 are synchronized with face feature amounts of each person included in a database in the HDD 117 at an appropriate timing. The face authentication execution control part 320 determines whether or not to permit execution of face authentication processing based on the face feature amounts of each person described above, each person distance, and feature amounts (an authentication permission condition) of each person. When execution of the face authentication processing is permitted, the face authentication processing part 321 executes the face authentication processing of the target person by verifying face feature amounts of each person included in the feature amount database 319 against the face feature amounts of the target person calculated by the face feature amount calculation part 318. The face authentication processing part 321 transmits an authentication result of the face authentication processing to the CPU 110 of the controller 100. The CPU 110 determines whether or not to permit the target person to log in the image forming apparatusimage forming apparatus 10 based on the received authentication result.

In the configuration of the program shown in FIG. 3 described above, a person who does not have an intention of using the image forming apparatusimage forming apparatus 10 may be erroneously determined as the user who has high possibility of using the image forming apparatusimage forming apparatus. For example, when a plurality of people exists in the imaging region A1, a person who is accidentally in the vicinity of the image forming apparatus 10 but does not have an intention of using the image forming apparatus 10 may be erroneously determined as the user who has high possibility of using the image forming apparatus 10. On the other hand, the user that uses the image forming apparatus 10 always looks into the display part 12 of the image forming apparatus 10 when using the image forming apparatus 10. That is, a person who looks into the display part 12 is considered as the user. In view of the above, the present embodiment executes the face authentication processing for a person who looks into the display part 12 when a plurality of people exists in the imaging region A1. In the present embodiment, an imaging region A2 having a narrower angle of view than the imaging region A1 is set in the imaging region A1 in order to determine whether or not a person looks into the display part 12.

Figure 4:
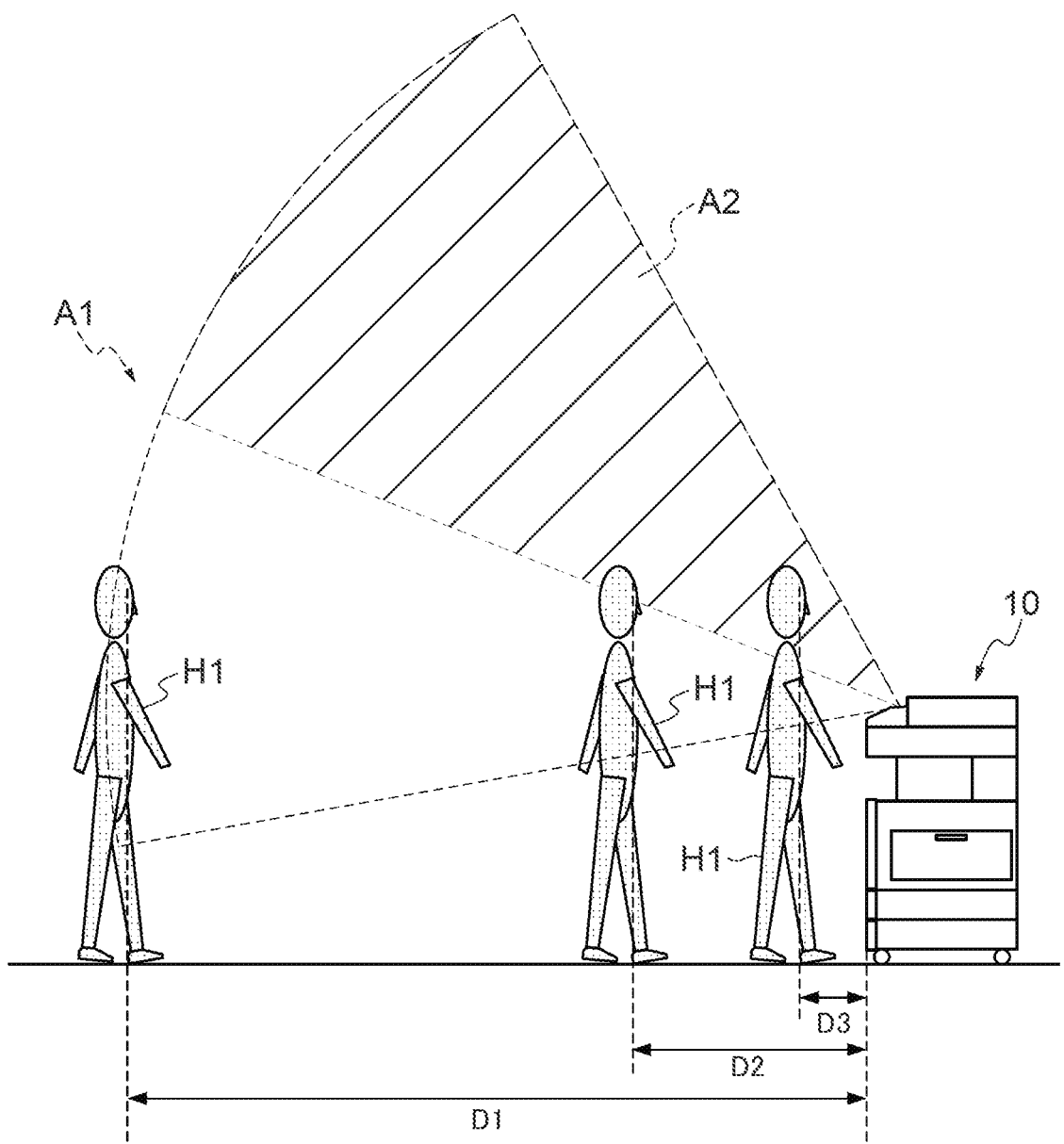
FIG. 4 is a view showing each imaging region as viewed from a right side of the image forming apparatus.
Figure 5:
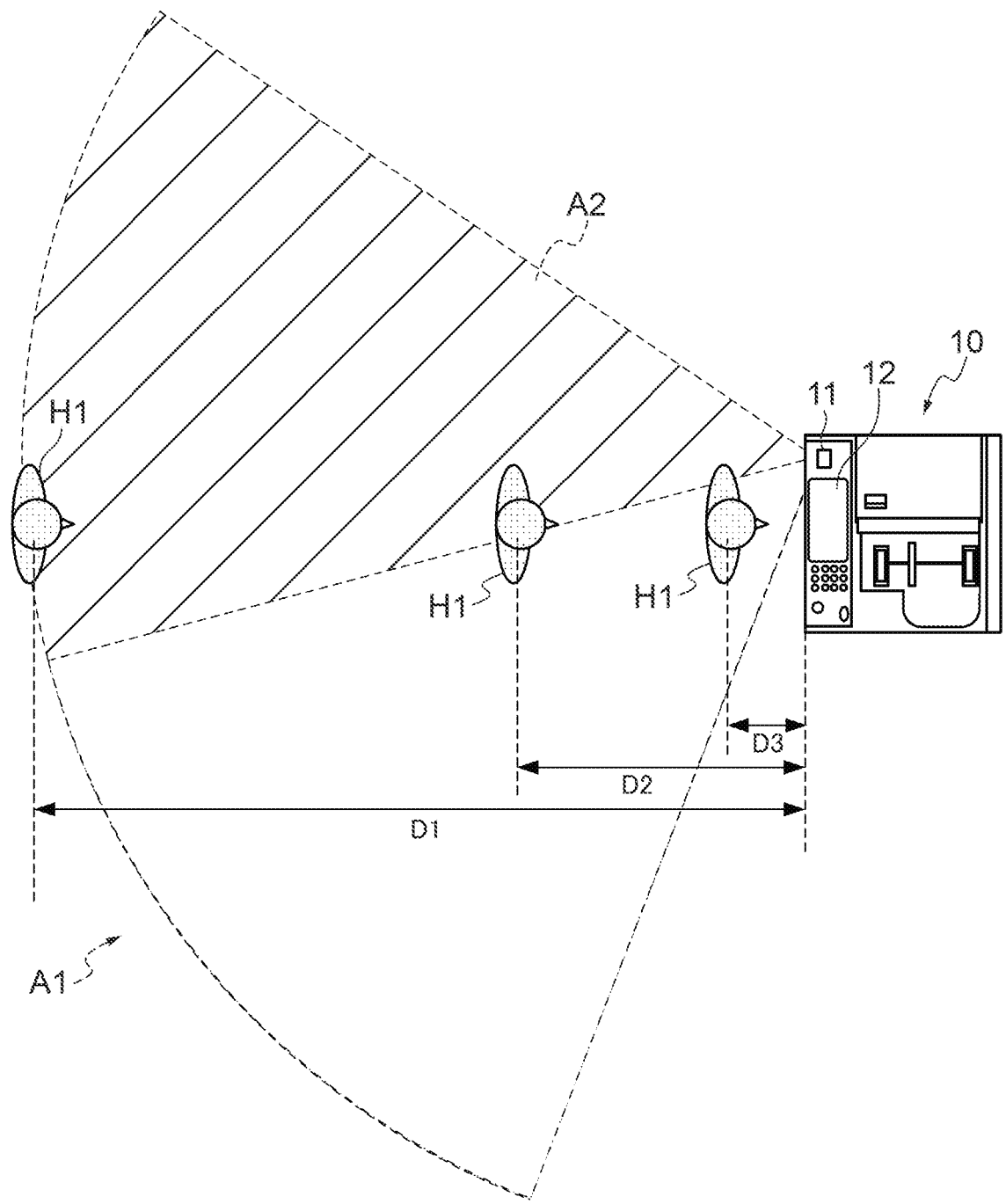
FIG. 5 is a view showing each imaging region as viewed from above the image forming apparatus.
Figure 6:
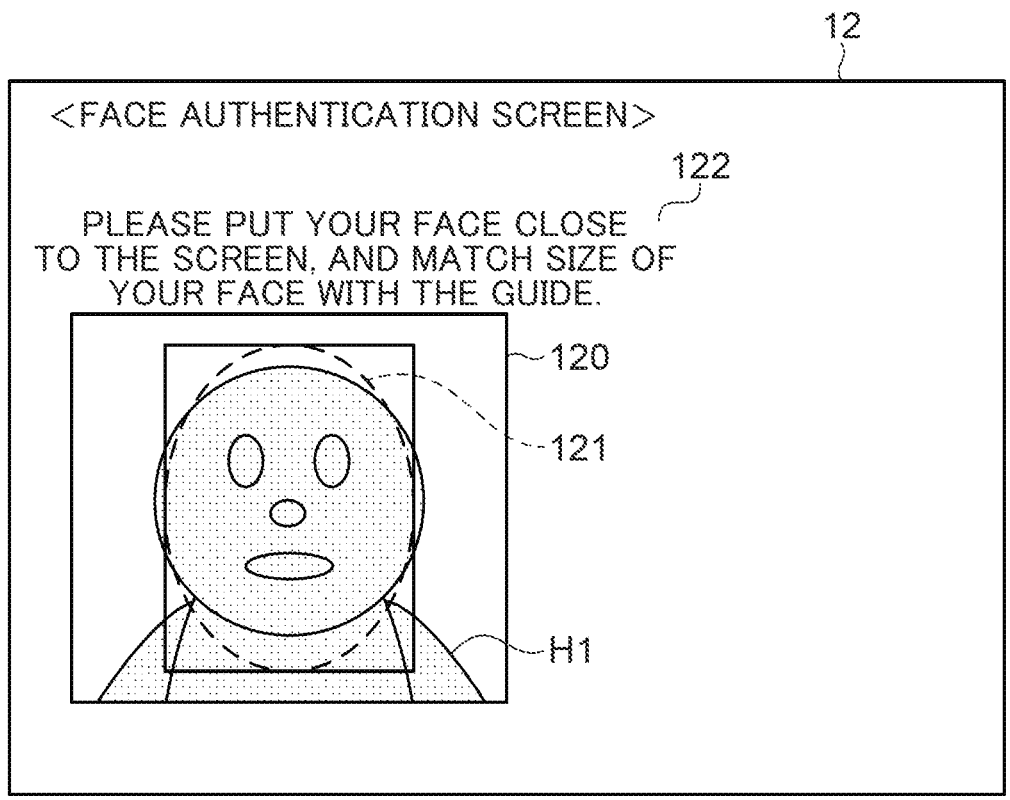
FIG. 6 is a view showing an example of a display part of the image forming apparatus.

FIGS. 4 and 5 are views which are useful in explaining a positional relationship between the imaging region A1 and the imaging region A2. FIG. 4 shows a case where the imaging region A1 and imaging region A2 are viewed from a right side of the image forming apparatus 10. FIG. 5 shows a case where the imaging region A1 and imaging region A2 are viewed from above the image forming apparatus 10. The camera 11 is disposed on the front of the image forming apparatus 10 so as to mainly image a front region of the image forming apparatus 10. In particular, in order to reliably image a person who looks into the display part 12, the camera 11 is disposed to have an imaging direction oriented in a somewhat obliquely upward direction. The imaging region A1 is a region that can be picked up by the camera 11 as described above. The imaging region A2 is part of the imaging region A1, occupies an upper range of the imaging region A1 so as to reliably include a person who looks into the display part 12 in the imaging region A2, and also occupies a range facing the display part 12 of the imaging region A1. It should be noted that, in FIGS. 4 and 5, the imaging region A2 is shown by hatching. The imaging region A1 is shown by a broken line, and the imaging region A2 is shown by a one dotted chain line. The display part 12 of the image forming apparatus 10 includes a face authentication screen 120, and the face authentication screen 120 displays a picked-up image of the imaging region A2 (FIG. 6).

As described above, the imaging region A2 occupies an upper range of the imaging region A1, and also occupies a range facing the display part 12 of the imaging region A1. That is, the imaging region A2 is an area in which an angle of view is set so that a face of the user is positioned almost in the center of a picked-up image of the imaging region A2 when the user standing in front of the image forming apparatus 10 approaches the image forming apparatus 10 closely in order to operate the display part 12. Accordingly, a person (a user H1) who looks into the display part 12 is displayed in a substantial center of a picked-up image of the imaging region A2, that is, the face authentication screen 120. In the face authentication screen 120, a face position guide 121 and a message 122 are displayed on an image of the user H1 in a superimposed manner. The face position guide 121 is a guide for the user H1 for moving a position of a face of the user H1 to the center of the face authentication screen 120. The message 122 is a message that prompts the user H1 to adjust a position of the face of the user H1. In this manner, the user H1 can reliably and easily move a position of the face of the user H1 to the center of the face authentication screen 120. When the face of the user H1 is moved to the center of the face authentication screen 120, the face region extraction part 317 can easily and correctly acquire a face feature amount of the user H1. Accordingly, the face authentication processing can be performed correctly.

As shown in FIGS. 4 and 5, as the user H1 is closer to the image forming apparatus 10, a distance (hereinafter referred to as the "user distance") between the user H1 and the image forming apparatus 10 is changed from D1 to D2, and then to D3. At this time, the proportion of a barycentric position, an area, a height, a width, and the like (feature amounts) of the user H1 to a picked-up image of the camera 11 is changed. That is, there exists a correlation between the user distance and feature amounts of the user H1 in a picked-up image of the camera 11. The detection part 300 described above acquires the user distance from the correlation described above based on feature amounts of the user H1 in a picked-up image of the camera 11.

Figure 7A:
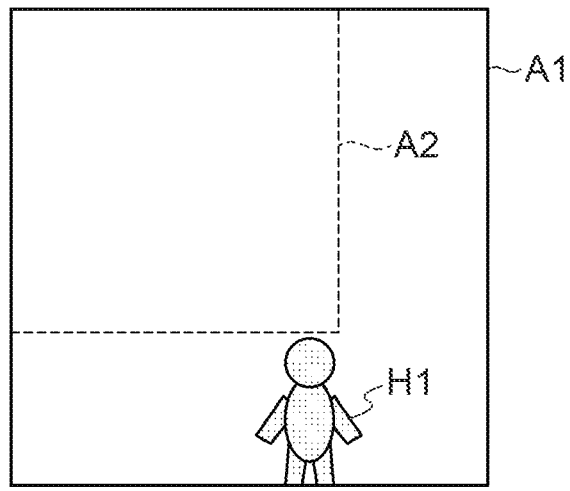
FIGS. 7A to 7C are views showing a change in a feature amount of the user in a picked-up image when a user distance is changed.
Figure 7B:
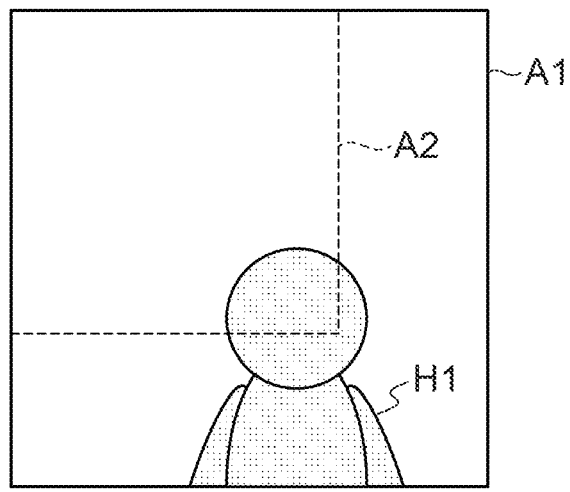
Figure 7C:
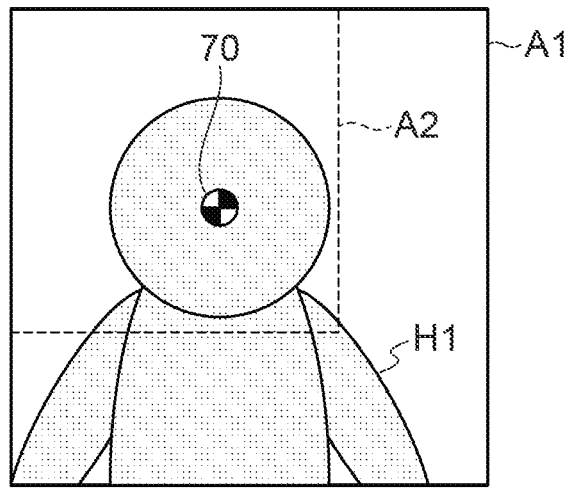

FIGS. 7A to 7C are views showing a change in a feature amount of the user in a picked-up image when the user distance is changed. FIG. 7A shows a case where the user distance is D1. FIG. 7B shows a case where the user distance is D2. FIG. 7C shows a case where the user distance is D3. An angle of view corresponding to the imaging region A1 in each of the diagrams is shown by a solid line, and an angle of view corresponding to the imaging region A2 is shown by a broken line. As described above, the imaging region A2 occupies an upper range of the imaging region A1, and also occupies a range facing the display part 12 of the imaging region A1. Accordingly, in each of the diagrams, the imaging region A2 is positioned in an upper left section of the imaging region A1. As shown in FIGS. 7A to 7C, when the user H1 moves closer to the image forming apparatus 10 and the user distance is changed from D1 to D3, the user H1 enters the imaging region A2. In the present embodiment, as shown in FIG. 7C, when a barycentric position 70 of the face of the user H1 exists in a predetermined region in the center of the imaging region A2 and the user distance is a predetermined value or smaller, it is considered that the user H1 has a firm intention of using the image forming apparatus 10. That is, the possibility that the user H1 is going to use the image forming apparatus 10 is considered to be high. It should be noted that, as the predetermined value, for example, a distance in which the user H1 can reach the display part 12 by hand is employed.

Figure 8:
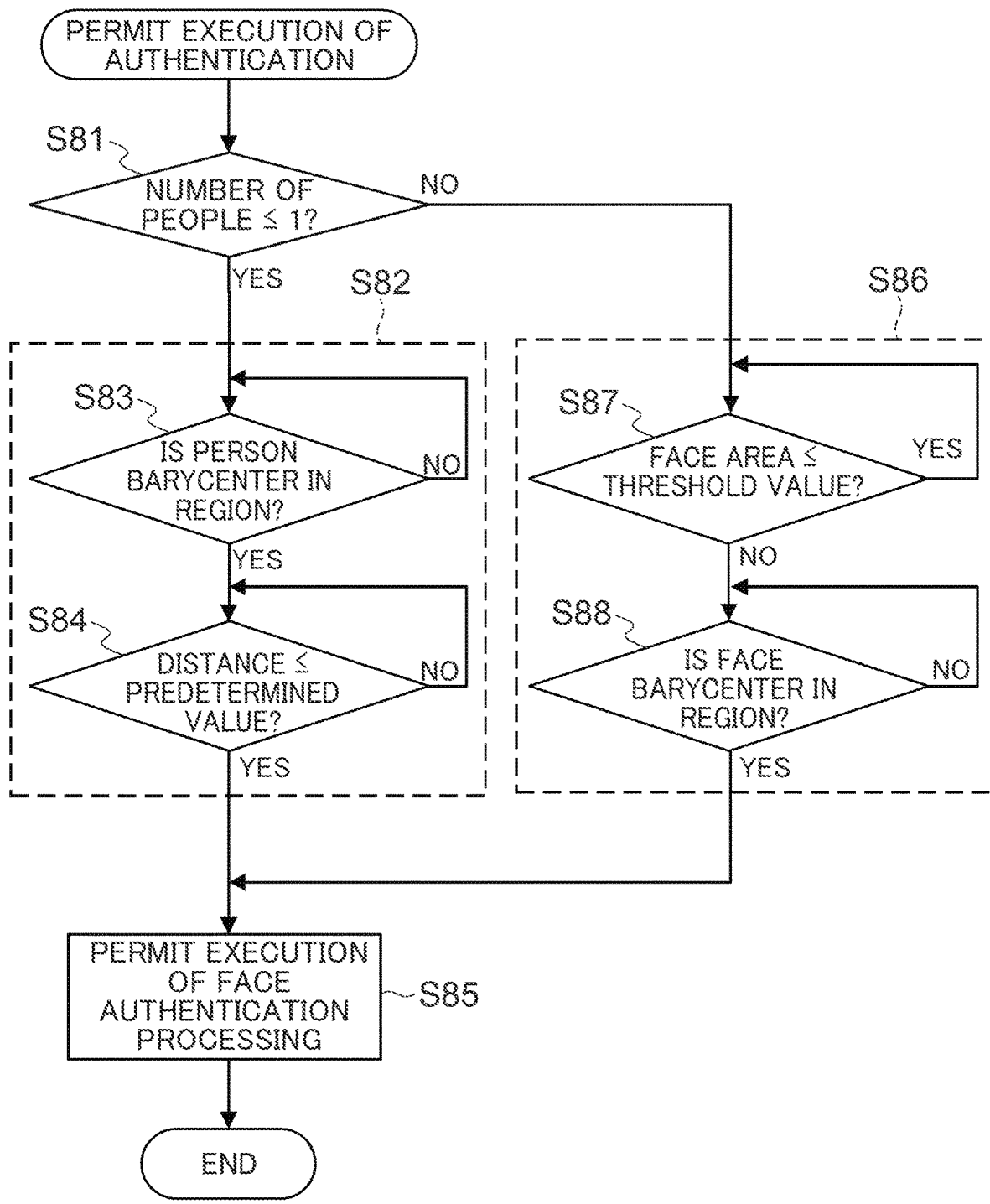
FIG. 8 is a flowchart showing face authentication permitting processing as a control method of the information processing apparatus according to the first embodiment of the present invention.

FIG. 8 is a flowchart showing face authentication permitting processing as a control method of the information processing apparatus according to the present embodiment. The present processing is performed when a program corresponding to the present processing stored in the ROM 112 is expanded in the RAM 111, and the CPU 301 executes the program. In FIG. 8, the CPU 301 determines whether or not the number of people in the imaging region A1 acquired by the human feature amount calculation part 314 is one or smaller (step S81).

Figure 9A:
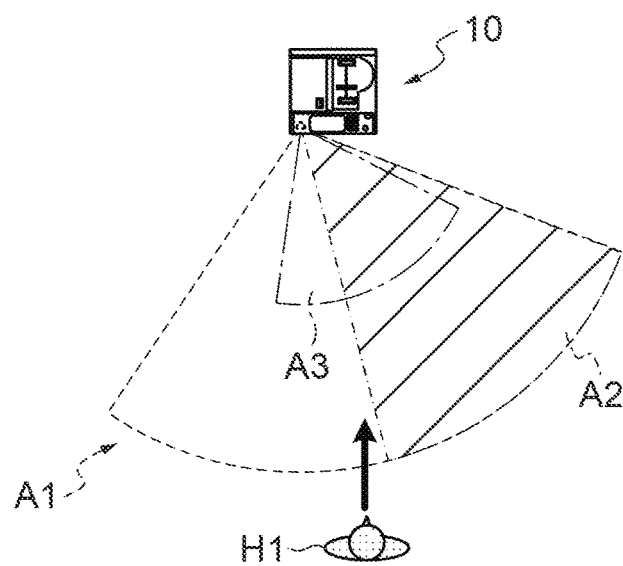
FIGS. 9A to 9C are views which are useful in explaining specific examples of the face authentication permitting processing of FIG. 8.
Figure 9B:
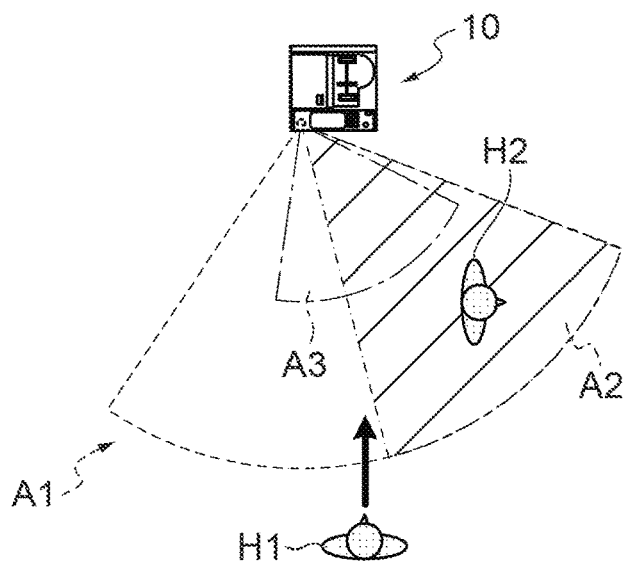
Figure 9C:
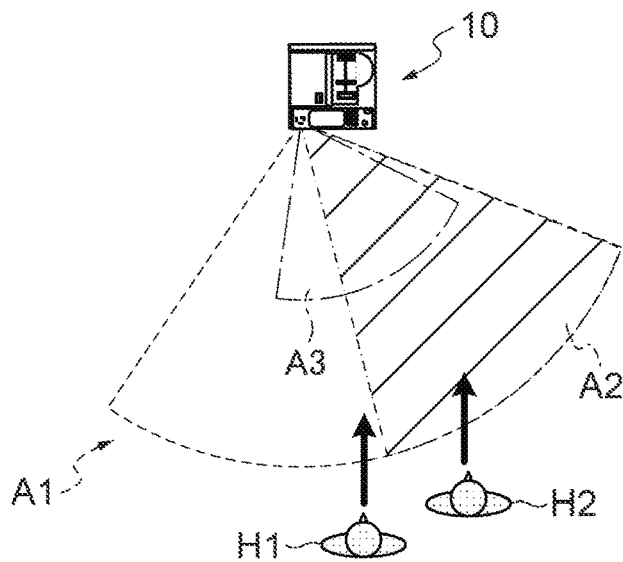

When it is determined that the number of people is one or smaller, the CPU 301 executes face authentication region determining processing of step S82. The face authentication region determining processing is processing for determining whether a person is within a face authentication region A3 based on a barycentric position (hereinafter referred to as the "person barycentric position") relating to an x direction and a y direction in a picked-up image of a person acquired by the human feature amount calculation part 314, and the person distance acquired by the feature amount-distance conversion part 316. The face authentication region A3 is included in the imaging region A1, and is smaller than the imaging region A1. For example, as shown in FIGS. 9A to 9C, an angle of view of the face authentication region A3 is narrower than an angle of view of the imaging region A1 (the face authentication region A3 is shown by a one dotted chain line in each of the diagrams). In order to acquire correct feature amounts of a person who exists in the face authentication region A3, the face authentication region A3 is limited to a region close to the camera 11. It should be noted that the face authentication region A3 does not match with the imaging region A2. For example, regarding an angle of view, an angle of view of the imaging region A2 is shifted closer to the display part 12 side than that of the face authentication region A3 in order to reliably include the person who looks into the display part 12 in the imaging region A2.

In the face authentication region determining processing of step S82, the CPU 301 first determines whether or not the person barycentric position exists in a region set in advance in a picked-up image (step S83). When the person barycentric position exists in the region set in advance, the CPU 301 then determines whether or not the person distance is a predetermined value or smaller (step S84). When the person barycentric position is in the region set in advance in the picked-up image and the person distance is the predetermined value or smaller, the CPU 301 determines that the person exists in the face authentication region A3, and the processing proceeds to step S85. In next step S85, the CPU 301 permits execution of the face authentication processing. When the person barycentric position does not exist in the region set in advance in the picked-up image, or when the person distance is not the predetermined value or smaller, the CPU 301 repeatedly executes step S83 and step S84. It should be noted that conditions for determining whether or not a person exists in the face authentication region A3 in step S82 are not limited to the person barycentric position and the person distance. For example, whether or not a person exists in the face authentication region A3 may be determined based on an area of the person, a width of the person, and the like.

When it is determined that the number of people is two or larger in step S81, the CPU 301 executes authentication face image determining processing of step S86. The authentication face image determining processing is processing for determining whether or not any of a plurality of people who exist in the imaging region A1 looks into the display part 12 based on the face feature amounts acquired by the face feature amount calculation part 318. Specifically, the authentication face image determining processing is processing for determining whether an area of a face of any of the people who exist in the imaging region A2 is a threshold value set in advance or larger, and whether a barycentric position of the face exists in a predetermined area in the center of the imaging region A2.

In the authentication face image determining processing of step S86, the CPU 301 first determines whether or not an area of a face of a person who exists in the imaging region A2 is a threshold value set in advance or larger (step S87). Next, when the area of the face of the person is the threshold value or larger, the CPU 301 determines whether a barycentric position of the face of the person exists in a predetermined region in the center of the imaging region A2 (step S88). When the area of the face of the person that exists in the imaging region A2 is the threshold value set in advance or larger, and the barycentric position of the face of the person exists in the predetermined area in the center of the imaging region A2, it is considered that the person looks into the display part 12 in order to use the image forming apparatus 10. In view of the above, in this case, the CPU 301 determines that the person looks into the display part 12, and the processing proceeds to step S85. In next step S85, the CPU 301 permits execution of the face authentication processing. When the area of the face of the person that exists in the imaging region A2 is smaller than the threshold value set in advance, or when the barycentric position of the face of the person does not exist in the predetermined area in the center of the imaging region A2, the CPU 301 repeatedly executes step S87 or S88. It should be noted that conditions for determining whether or not a person looks into the display part 12 in step S86 are not limited to an area of a face of the person and a barycentric position of the face. For example, whether or not a person looks into the display part 12 may be determined based on a direction of a face of the person, a line of sight of the person, and the like. In the authentication face image determining processing of step S86, whether or not the person distance acquired by the feature amount-distance conversion part 316 is a predetermined value or smaller may be determined in addition to steps S87 and S88. When a plurality of people exists in the imaging region A2, the authentication face image determining processing of step S86 is executed for any of the people. Alternatively, the authentication face image determining processing of step S86 may be executed only for a person closest to the image forming apparatus 10. After the above, the present processing is finished.

When the number of people that exist in the imaging region A1 is one, a person who does not have an intention of using the image forming apparatus 10 is never erroneously determined as the user among a plurality of people. Accordingly, when the number of people that exist in the imaging region A1 is one, execution of the face authentication processing is simply permitted only based on whether or not the person exists in the face authentication region A3 close to the image forming apparatus 10 in the face authentication permitting processing of FIG. 8. When the number of people that exist in the imaging region A1 is two or larger, there is possibility that a person who does not have an intention of using the image forming apparatus 10 is erroneously determined as the user among a plurality of people. As described above, there is high possibility that a person who looks into the display part 12 is going to use the image forming apparatus 10. In view of the above, when the number of people that exist in the imaging region A1 is two or larger, execution of the face authentication processing is permitted based on whether or not the person looks into the display part 12, instead of whether or not the person exists in the face authentication region A3, in the face authentication permitting processing of FIG. 8. That is, a condition for permitting execution of the face authentication processing is changed in accordance with the number of people that exist in the imaging region A1. It should be noted that, in order to determine that a person looks into the display part 12, the person needs to be significantly close to the image forming apparatus 10. That is, a region in which a person looks into the display part 12 exists is considered to be smaller than the face authentication region A3.

FIGS. 9A to 9C are views which are useful in explaining specific examples of the face authentication permitting processing of FIG. 8. First, a consideration is made on a case where one of the user H1 approaches the image forming apparatus 10 (FIG. 9A). In this case, when the user H1 enters the imaging region A1, the detection part 300 detects the user H1 and determines that the number of people that exist in the imaging region A1 is one, and determines whether or not the user H1 enters the face authentication region A3. Next, when the user H1 enters the face authentication region A3, the face authentication processing part 321 of the detection part 300 executes the face authentication processing. A consideration is also made on a case where a user H2 has already existed in the imaging region A1 and another user H1 approaches the image forming apparatus 10 (FIG. 9B). In this case, when the user H1 enters the imaging region A1, the detection part 300 detects not only the user H2 but also the user H1 and determines that the number of people that exist in the imaging region A1 is two, and determines whether or not any one of the users looks into the display part 12. Next, when any one of the users looks into the display part 12, the face authentication processing part 321 of the detection part 300 executes the face authentication processing. Further, a consideration is made on a case where not only the user H1 but also the user H2 approaches the image forming apparatus 10 at the same time (FIG. 9C). In this case, when the user H1 and the user H2 enter the imaging region A1 almost at the same time, the detection part 300 determines that the number of people that exist in the imaging region A1 is two, and determines whether or not any one of the users looks into the display part 12. Next, when any one of the users looks into the display part 12, the face authentication processing part 321 of the detection part 300 executes the face authentication processing.

According to the face authentication permitting processing of FIG. 8, a condition for permitting execution of the face authentication processing is changed in accordance with the number of people that exist in the imaging region A1. For example, when the number of people that exist in the imaging region A1 is one, a person who does not have an intention of using the image forming apparatus 10 is never erroneously determined as the user among a plurality of people. Accordingly, execution of the face authentication processing is permitted based only on whether or not the person exists in the face authentication region A3. When the number of people that exist in the imaging region A1 is two or larger, there is possibility that a person who does not have an intention of using the image forming apparatus 10 is erroneously determined as the user among a plurality of people. Accordingly, execution of the face authentication processing is permitted based on whether or not any person looks into the display part 12.

As described above, a region in which a person looks into the display part 12 exists is considered to be smaller than the face authentication region A3. Accordingly, execution of the face authentication processing in a case where the number of people that exist in the imaging region A1 is one is started earlier as compared with a case where the number of people that exist in the imaging region A1 is two or larger. As a result, when the number of people who exist in the imaging region A1 is one, the face authentication processing can be finished by the time the user arrives at the image forming apparatus 10, and the user can use the image forming apparatus 10 immediately. Accordingly, lowering convenience of the user can be prevented. On the other hand, when the number of people included in a surrounding image that has been picked up is two or larger, execution of the face authentication processing is permitted based on whether or not a person looks into the display part 12. In this manner, possibility that a person who does not have an intention of using the image forming apparatus 10 is erroneously determined as the user can be reduced. As described above, the face authentication permitting processing of FIG. 8 can prevent erroneous determination of the user and lowering convenience of the user.

Next, a second embodiment of the present invention will be described. The second embodiment has a configuration and a function which are basically the same as those of the first embodiment described above. Accordingly, overlapping configuration and function will be omitted from description, and different configuration and function will be described hereinafter. In the first embodiment, when the number of people that exist in the imaging region A1 is two or larger, execution of the face authentication processing is permitted based on whether or not any of the people looks into the display part 12. However, the second embodiment is different from the first embodiment with respect to the point that, when the number of people that exist in the imaging region A1 is two or larger, execution of the face authentication processing is permitted based on whether or not any of the people remains in another face authentication region A4 which is smaller than the face authentication region A3.

Figure 10:
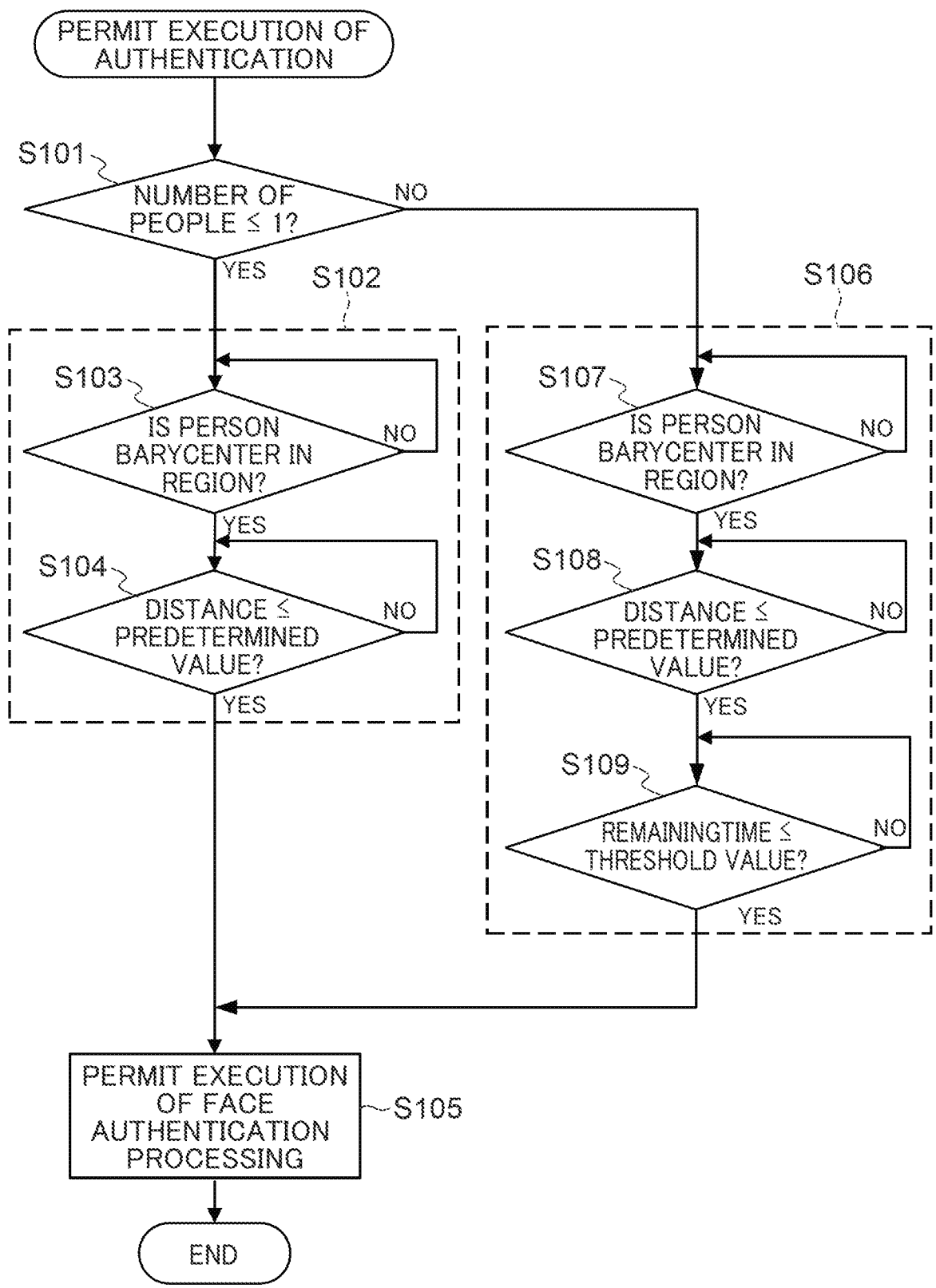
FIG. 10 is a flowchart showing face authentication permitting processing as a control method of an information processing apparatus according to a second embodiment of the present invention.

FIG. 10 is a flowchart showing face authentication permitting processing as a control method of the information processing apparatus according to the present embodiment. The present processing is performed when a program corresponding to the present processing stored in the ROM 112 is expanded in the RAM 111, and the CPU 301 executes the program. In FIG. 10, the CPU 301 first determines whether or not the number of people that exist in the imaging region A1 acquired by the human feature amount calculation part 314 is one or smaller (step S101).

When it is determine that the number of people is one or smaller, the CPU 301 executes face authentication region determining processing of step S102. The face authentication region determining processing is processing for determining whether a person exists in the face authentication region A3 based on the person barycentric position acquired by the human feature amount calculation part 314, and the person distance acquired by the feature amount-distance conversion part 316. It should be noted that the face authentication region A3 in the present embodiment is the same as the face authentication region A3 in the first embodiment (the face authentication region A3 is shown by a one dotted chain line in FIGS. 11A to 11C).

In the face authentication region determining processing of step S102, the CPU 301 first determines whether or not the person barycentric position exists in a region set in advance in a picked-up image (step S103). When the person barycentric position exists in the region set in advance, the CPU 301 then determines whether or not the person distance is a predetermined value or smaller (step S104). When the person barycentric position is in the region set in advance in the picked-up image and the person distance is the predetermined value or smaller, the CPU 301 determines that the person exists in the face authentication region A3, and the processing proceeds to step S105. In next step S105, the CPU 301 permits execution of the face authentication processing. It should be noted that, when the person barycentric position does not exist in the region set in advance in the picked-up image or when the person distance is not the predetermined value or smaller, the CPU 301 repeatedly executes step S103 or S104.

Figure 11A:
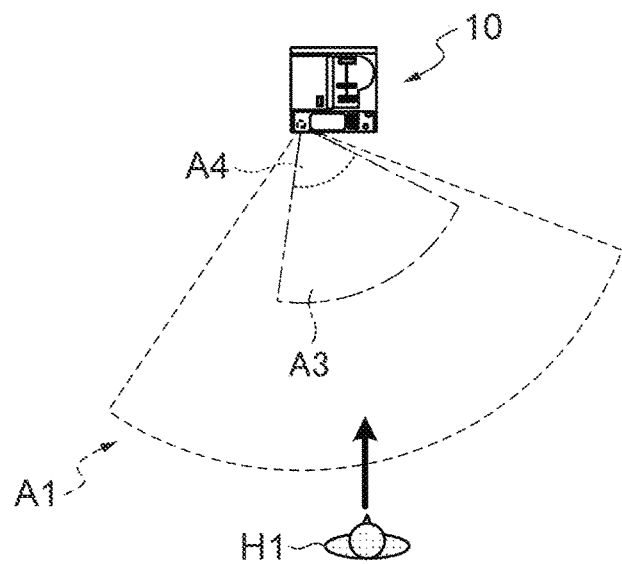
FIGS. 11A to 11C are views which are useful in explaining specific examples of the face authentication permitting processing of FIG. 10.
Figure 11B:
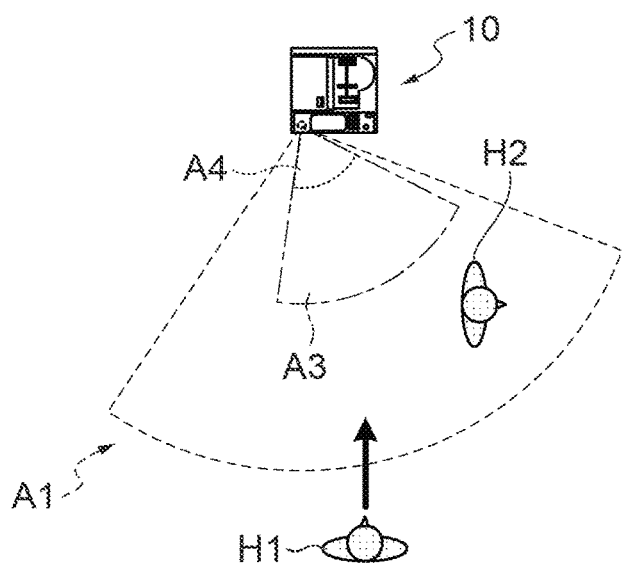
Figure 11C:
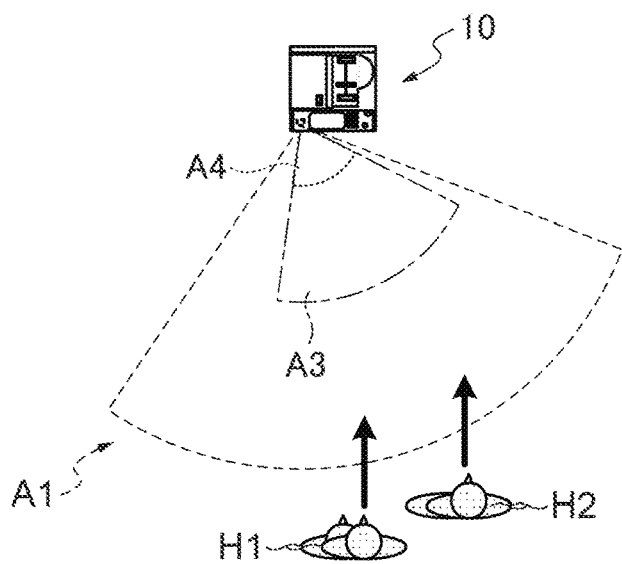

When it is determined that the number of people is two or larger in step S101, the CPU 301 executes another face authentication region determining processing of step S106. The another face authentication region determining processing is processing for determining whether or not a person exists in the other face authentication region A4 based on the person barycentric position and the person distance, and also determining whether or not the person remains in the other face authentication region A4. For example, when the number of people that exist in the imaging region A1 is two or larger, there is possibility that a person who does not have an intention of using the image forming apparatus 10 is erroneously determined as the user among a plurality of people. On the other hand, it is considered that the user who has high possibility of using the image forming apparatus 10 remains in the extreme vicinity of the image forming apparatus 10. In view of the above, in the present embodiment, when the number of people that exist in the imaging region A1 is two or larger, another face authentication region A4 smaller than the face authentication region A3 is used for determination of the user. Further, whether or not a person remains in the another face authentication region A4 is determined. In this manner, whether or not the person is the user who has high possibility of using the image forming apparatus 10 can be determined correctly. For example, as shown in FIGS. 11A to 11C, the another face authentication region A4 is smaller than the face authentication region A3. It should be noted that an angle of view of the another face authentication region A4 is the same as an angle of view of the face authentication region A3 (the another face authentication region A4 is shown by a thin broken line in each of the diagrams).

In the another face authentication region determining processing of step S106, the CPU 301 first determines whether or not the person barycentric position exists in a region set in advance in a picked-up image (step S107). Next, when the person barycentric position exists in the region set in advance, the CPU 301 then determines whether or not the person distance is a predetermined value or smaller (step S108). Further, when the person distance is the predetermined value or smaller, whether or not a time period in which the person remains in the another face authentication region A4 is a period set in advance (threshold value) or larger is determined (step S109). When the person barycentric position exists in the region set in advance in the picked-up image, the person distance is the predetermined value or smaller, and the time period in which the person remains in the other face authentication region A4 is the threshold value or larger, the CPU 301 determines that the person remains in the other face authentication region A4. After the above, the CPU 301 proceeds to step S105, and permits execution of the face authentication processing. It should be noted that, when the person barycentric position does not exist in the region set in advance in the picked-up image or when the person distance is not the predetermined value or smaller, the CPU 301 repeatedly executes step S107 or S108. When the time period in which the person remains in the other face authentication region A4 is smaller than the threshold value, the CPU 301 repeatedly executes step S109. It should be noted that, when a plurality of people exists in the imaging region A2, the another face authentication region determining processing of step S106 is executed for any of the people. Alternatively, the face authentication region determining processing of step S106 may be executed only for a person closest to the image forming apparatus 10. After the above, the present processing is finished.

As described above, in the face authentication permitting processing of FIG. 10, when the number of people that exist in the imaging region A1 is one, execution of the face authentication processing is permitted only based on whether or not the person exists in the face authentication region A3. On the other hand, when the number of people that exist in the imaging region A1 is two or larger, execution of the face authentication processing is permitted based on whether or not the person remains in the other face authentication region A4, instead of whether or not the person exists in the face authentication region A3. That is, in the second embodiment as well, a condition for permitting execution of the face authentication processing is changed in accordance with the number of people that exist in the imaging region A1.

FIGS. 11A to 11C are views which are useful in explaining specific examples of the face authentication permitting processing of FIG. 10. First, a consideration is made on a case where one of the user H1 approaches the image forming apparatus 10 (FIG. 11A). In this case, when the user H1 enters the imaging region A1, the detection part 300 detects the user H1 and determines that the number of people that exist in the imaging region A1 is one, and determines whether or not the user H1 enters the face authentication region A3. Next, when the user H1 enters the face authentication region A3, the face authentication processing part 321 of the detection part 300 executes the face authentication processing. A consideration is also made on a case where the user H2 has already existed in the imaging region A1 and another user H1 approaches the image forming apparatus 10 (FIG. 11B). In this case, when the user H1 enters the imaging region A1, the detection part 300 detects not only the user H2 but also the user H1 and determines that the number of people that exist in the imaging region A1 is two, and also determines whether or not any one of the users remains in the other face authentication region A4. Next, when any one of the users remains in the other face authentication region A4, the face authentication processing part 321 of the detection part 300 executes the face authentication processing. Further, a consideration is made on a case where not only the user H1 but also the user H2 approach the image forming apparatus 10 at the same time (FIG. 11C). In this case, when the user H1 and the user H2 enter the imaging region A1 almost at the same time, the detection part 300 determines that the number of people that exist in the imaging region A1 is two, and determines whether or not any one of the users remains in the another face authentication region A4. Next, when any one of the users remains in the another face authentication region A4, the face authentication processing part 321 of the detection part 300 executes the face authentication processing.

According to the face authentication permitting processing of FIG. 10, a condition for permitting execution of the face authentication processing is changed in accordance with the number of people that exist in the imaging region A1. For example, when the number of people that exist in the imaging region A1 is one, a person who does not have an intention of using the image forming apparatus 10 is never erroneously determined as the user among a plurality of people. Accordingly, execution of the face authentication processing is permitted based only on whether or not the person exists in the face authentication region A3. When the number of people that exist in the imaging region A1 is two or larger, there is possibility that a person who does not have an intention of using the image forming apparatus 10 is erroneously determined as the user among a plurality of people. Accordingly, execution of the face authentication processing is permitted based on whether or not any of the people remains in the another face authentication region A4 that is smaller than the face authentication region A3.

As described above, since the another face authentication region A4 is smaller than the face authentication region A3, execution of the face authentication processing in a case where the number of people that exist in the imaging region A1 is one is started earlier as compared with a case where the number of people that exist in the imaging region A1 is two or larger. As a result, when the number of people who exist in the imaging region A1 is one, the face authentication processing can be finished by the time the user arrives at the image forming apparatus 10, and the user can use the image forming apparatus 10 immediately. Accordingly, lowering convenience of the user can be prevented. On the other hand, when the number of people included in a surrounding image that has been picked up is two or larger, execution of the face authentication processing is permitted based on whether or not a person remains in the other face authentication region A4 that is smaller than the face authentication region A3. In this manner, possibility that a person who does not have an intention of using the image forming apparatus 10 is erroneously determined as the user can be reduced. As described above, the face authentication permitting processing of FIG. 10 can prevent erroneous determination of the user, and also prevent lowering convenience of the user.

Next, a third embodiment of the present invention will be described. The third embodiment has a configuration and a function which are basically the same as those of the first embodiment described above. Accordingly, overlapping configuration and function will be omitted from description, and different configuration and function will be described hereinafter. In the first embodiment, the image forming apparatus 10 includes the only one camera 11. However, the third embodiment is different from the first embodiment with respect to the point that an image forming apparatus 20 includes two cameras, a first camera 14 and a second camera 15.

Figure 12:
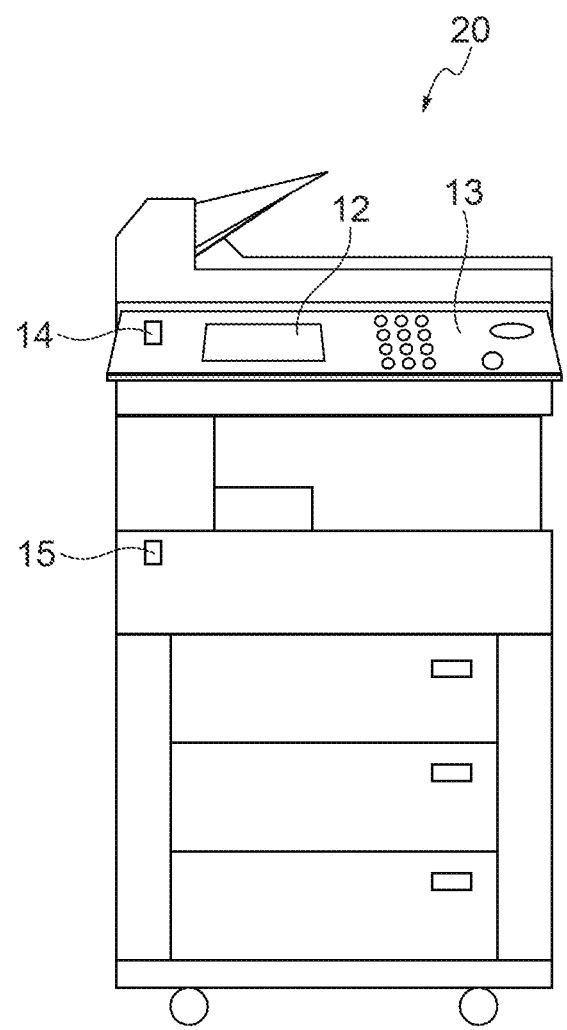
FIG. 12 is an external view showing an image forming apparatus as an information processing apparatus according to a third embodiment of the present invention.

FIG. 12 is an external view showing the image forming apparatus as an information processing apparatus according to the third embodiment of the present invention. In FIG. 12, the image forming apparatus 20 has a configuration similar to that of the image forming apparatus 10, but includes the first camera 14 and the second camera 15 in place of the camera 11. The first camera 14 and the second camera 15 are oriented to the same direction in the image forming apparatus 20. For example, in a front view of the image forming apparatus 20, the first camera 14 is disposed in an upper left direction of the display part 12, and the second camera 15 is disposed below the first camera 14. Hereinafter, in the present embodiment, a region that can be picked up by the first camera 14 will be referred to as an imaging region A5 and a region that can be picked up by the second camera 15 will be referred to as an imaging region A6.

Figure 13:
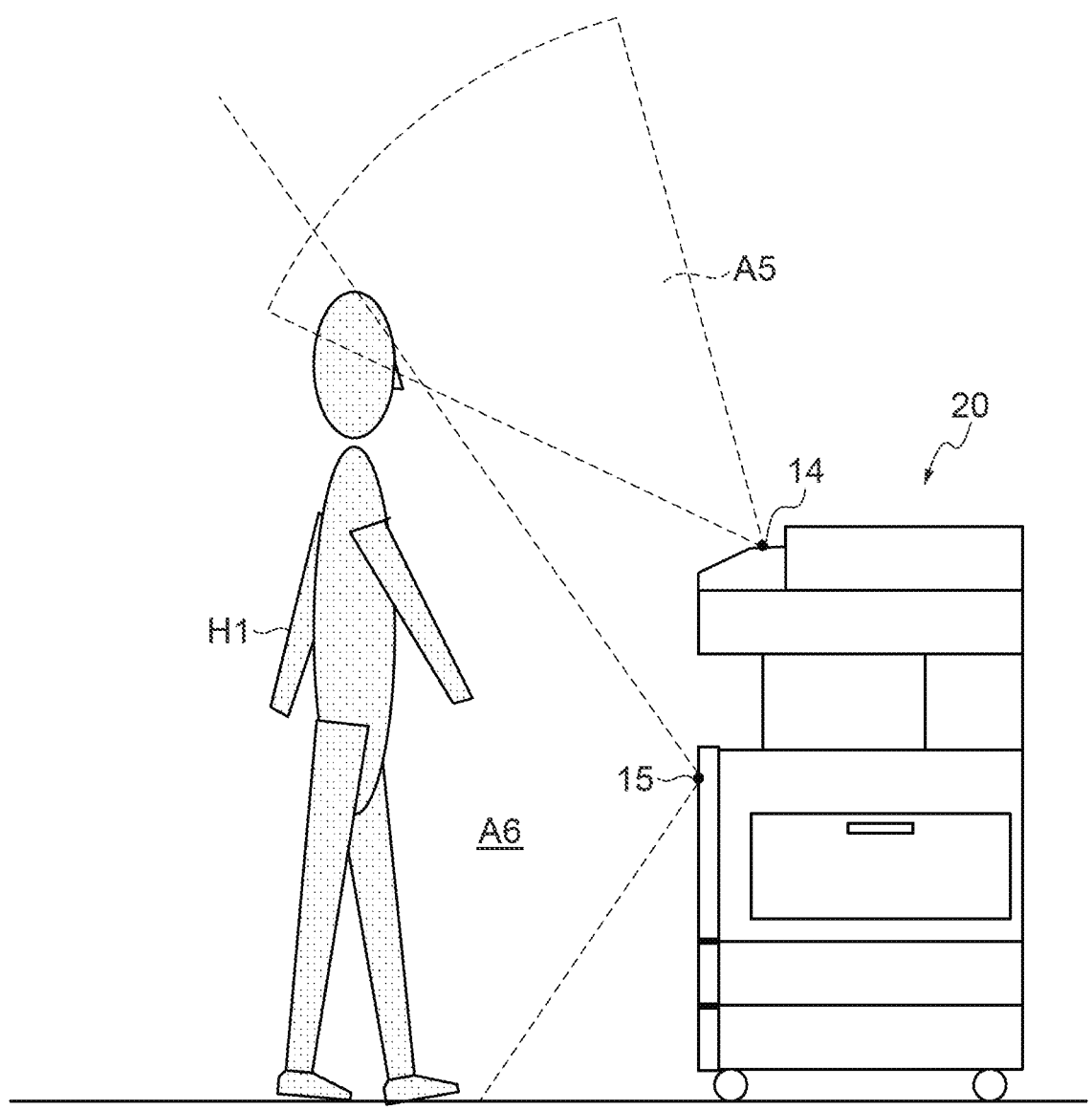
FIG. 13 is a view showing each imaging region as viewed from a right side of the image forming apparatus.

FIG. 13 is a view which are useful in explaining a positional relationship between the imaging region A5 and the imaging region A6. FIG. 13 shows a case where the imaging region A5 and the imaging region A6 are viewed from a right side of the image forming apparatus 20. The first camera 14 and the second camera 15 are disposed on a front side of the image forming apparatus 20 so as to mainly image a front region of the image forming apparatus 20. The first camera 14 is disposed to have an imaging direction oriented in a somewhat obliquely upward direction, so that a person who looks into the display part 12 is reliably picked up. The second camera 15 has a horizontal imaging direction and an angle of view set to be wide, so that a wide range of a front region of the image forming apparatus 20 can be picked up. It should be noted that, in the image forming apparatus 20, the face authentication screen 120 of the display part 12 displays a picked-up image of the imaging region A5. Like the imaging region A2 described above, the imaging region A5 is an area in which an angle of view is set so that a face of the user is positioned almost in the center of a picked-up image of the imaging region A5 when the user standing in front of the image forming apparatus 20 approaches the image forming apparatus 20 closely in order to operate the display part 12. Accordingly, a person (the user H1) who looks into the display part 12 is displayed in a substantial center of a picked-up image of the imaging region A5, that is, the face authentication screen 120. As described later, in the third embodiment, whether or not a person who exists in front of the image forming apparatus 20 is the user who has high possibility of using the image forming apparatus 20 is determined by using moving information of a position of a toe of a person approaching the image forming apparatus 20. Accordingly, for the imaging region A6, an angle of view is set so that a toe of the user H1 who is approaching the image forming apparatus 20 is included. For the imaging region A6, an angle of view is also set so that a face of a person who is somewhat away from the image forming apparatus 20 is included. It should be noted that the imaging region A6 includes the face authentication region A3 (not shown) like the imaging region A1.

It should be noted that, in the present embodiment as well, like the first embodiment, a person who looks into the display part 12 is considered as the user who has high possibility of using the image forming apparatus 20. When a plurality of people exists in the imaging region A6, the face authentication processing is executed for a person who looks into the display part 12. In the present embodiment, the imaging region A5 is used in order to determine whether or not a person looks into the display part 12.

Figure 14:
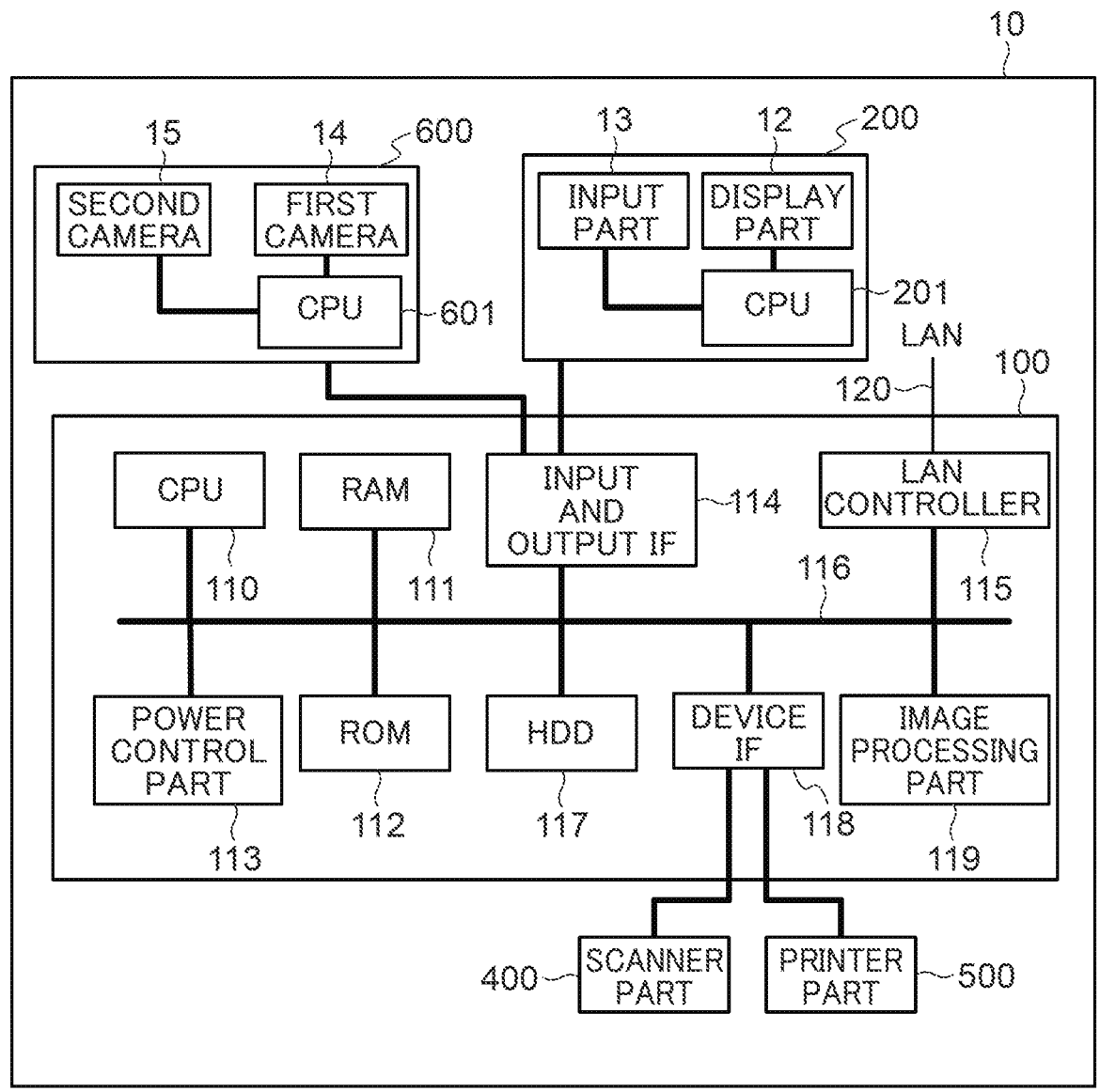
FIG. 14 is a block diagram schematically showing an internal configuration of the image forming apparatus.

FIG. 14 is a block diagram schematically showing an internal configuration of the image forming apparatus 20 of FIG. 12. It should be noted that the internal configuration of the image forming apparatus 20 is almost the same as the internal configuration of the image forming apparatus 10, and only the differences therefrom will be described hereinafter. The image forming apparatus 20 includes a detection part 600 in place of the detection part 300.

The detection part 600 executes the human detection sensor function and the face authentication function. The detection part 600 includes a CPU 601, the first camera 14, and the second camera 15. The CPU 601 starts or stops execution of the human detection sensor function or the face authentication function and controls supply of power to the first camera 14 and the second camera 15 in accordance with an on or off request from the CPU 110. The operation part 200 and the detection part 600 work together to display an image picked up by the first camera 14 on the display part 12. Specifically, the CPU 601 first acquires an image picked up by the first camera 14 at intervals of a certain period of time, and stores image data in a RAM (not shown) incorporated in the CPU 601. Next, the CPU 601 transmits the image data that has already been stored in the internal RAM to the controller 100. The CPU 110 stores the received image data in the RAM 111, and also combines the received image data with another image data, such as a message, and transmits the combined image data to the operation part 200. The operation part 200 displays the transmitted image data on the display part 12. It should be noted that, when size of the image data is large as compared to capacity of the internal RAM of the CPU 601, a new storage region, such as an external SDRAM, may be provided in the detection part 600 so that the image data can be stored in the storage region. The operation part 200 and the detection part 600 have their own CPUs 201 and 601. The configuration may also be such that one CPU is shared by the operation part 200 and the detection part 600, and the CPU controls the operation part 200 and the detection part 600.

Figure 15:
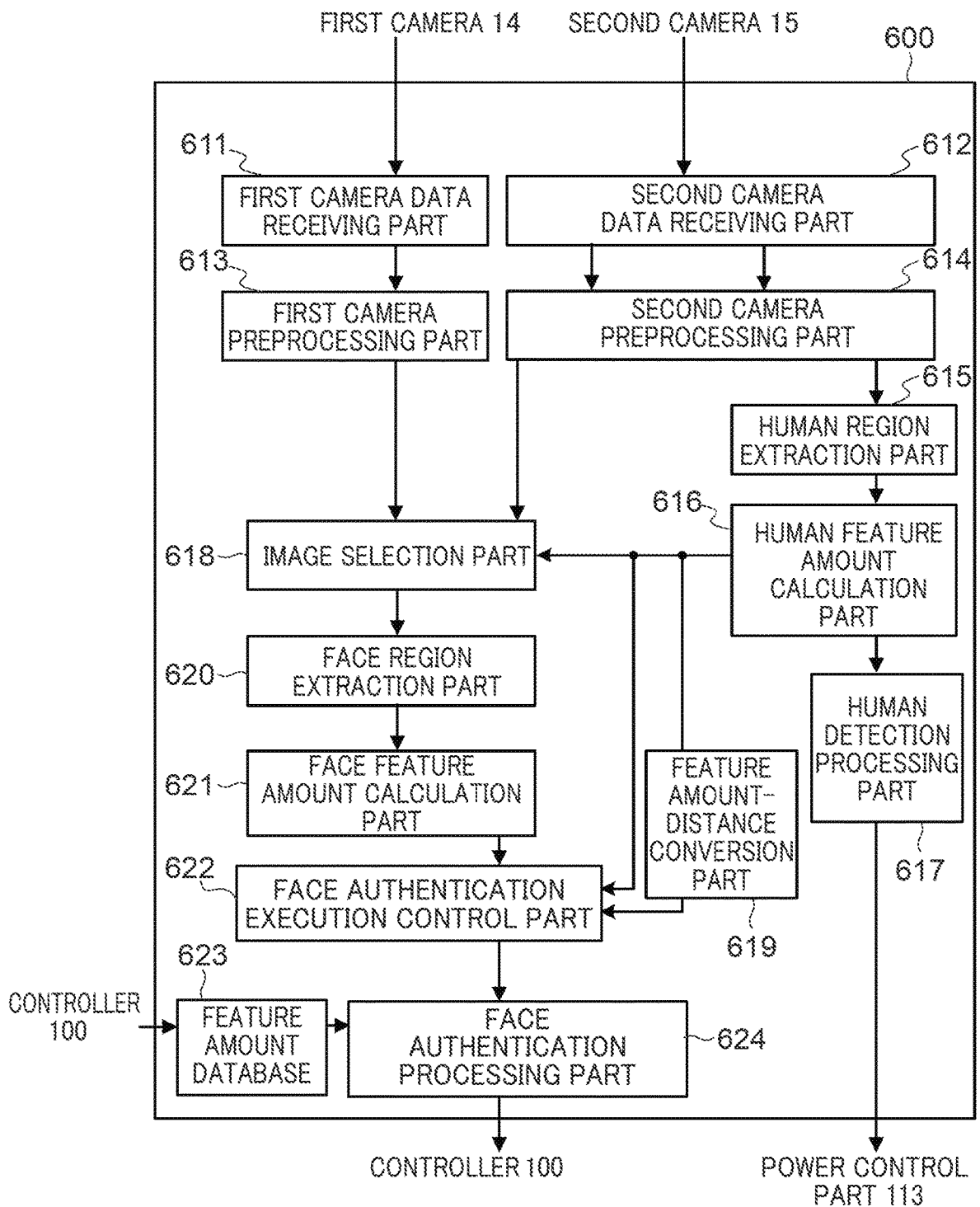
FIG. 15 is a view which is useful in explaining a configuration and data flow of a program corresponding to a face authentication function executed by a CPU of a detection part.

FIG. 15 is a view which is useful in explaining a configuration and data flow of a program corresponding to the face authentication function executed by the CPU 601 of the detection part 600. Arrows in FIG. 15 show flow of data, such as image data. In FIG. 15, the detection part 600 includes, as modules for executing a program, a first camera data receiving part 611, a second camera data receiving part 612, a first camera preprocessing part 613, and a second camera preprocessing part 614. As the modules described above, the detection part 600 also includes a human region extraction part 615, a human feature amount calculation part 616, a human detection processing part 617, an image selection part 618, and a feature amount-distance conversion part 619. The detection part 600 also includes, as the modules described above, a face region extraction part 620, a face feature amount calculation part 621, a face authentication execution control part 622, a feature amount database 623, and a face authentication processing part 624.

The first camera data receiving part 611 receives image data from the first camera 14 and stores the image data in the internal RAM of the CPU 601. The image data received here is a picked-up image of the imaging region A5 that is a region that can be picked up by the first camera 14. The second camera data receiving part 612 receives image data from the second camera 15 and stores the image data in the internal RAM of the CPU 601. The image data received here is a picked-up image of the imaging region A6 that is a region that can be picked up by the second camera 15. The first camera preprocessing part 613 applies image processing, such as contrast correction, color/monochrome conversion, and enlarging/reduction in size, to the picked-up image of the imaging region A5 stored in the internal RAM to convert the picked-up image to image data that can be handled by processing parts on a downstream side. The second camera preprocessing part 614 applies image processing, such as contrast correction, color/monochrome conversion, and enlarging/reduction in size, to the picked-up image of the imaging region A6 stored in the internal RAM to convert the picked-up image to image data that can be handled by processing parts on a downstream side. Like the human region extraction part 313, the human region extraction part 615 extracts a region (human region) occupied by a person that exists in a forward direction (on a front side) of the image forming apparatus 20 in the picked-up image of the imaging region A6. When a plurality of people exists in the imaging region A6, a human region is extracted for each person.

Like the human feature amount calculation part 314, the human feature amount calculation part 616 acquires the number of people that exists in the imaging region A6, and acquires feature amounts of each person that exists in the imaging region A6. Further, the human feature amount calculation part 616 also acquires movement information of a toe of a person having a largest area in a picked-up image among people that exist in the imaging region A6. The human detection processing part 617 refers to the movement information of a toe acquired by the human feature amount calculation part 616 to select a person of a human region having a largest area as a target (target person) for human detection processing. When the movement information matches with a pattern set in advance, a person relating to the movement information is determined as the user who has possibility of using the image forming apparatus 20. The human detection processing part 617 transmits the determination result to the power control part 113, and, in accordance with the determination result, the power control part 113 changes a power mode of the image forming apparatus 20 from the sleep mode to the standby mode. The image selection part 618 determines whether to use a picked-up image of the imaging region A6 for the face authentication processing or to use a picked-up image of the imaging region A5 for the face authentication processing based on the number of people that exist in the imaging region A6 acquired by the human feature amount calculation part 616. The feature amount-distance conversion part 619, the face region extraction part 620, and the face feature amount calculation part 621 operate in a similar manner as the feature amount-distance conversion part 316, the face region extraction part 317, and the face feature amount calculation part 318 of the detection part 300. The face authentication execution control part 622, the feature amount database 623, and the face authentication processing part 624 operate in a similar manner as the face authentication execution control part 320, the feature amount database 319, and the face authentication processing part 321 of the detection part 300.

Figure 16:
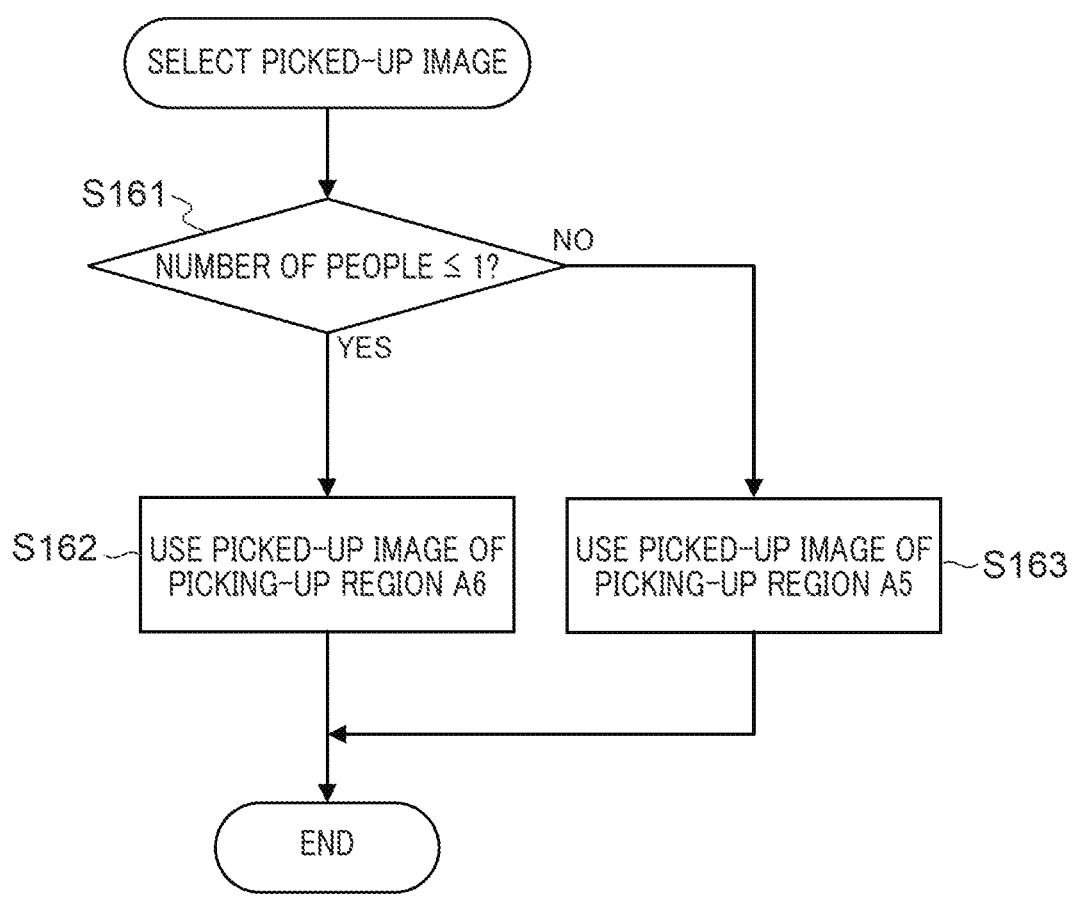
FIG. 16 is a flowchart showing picked-up image selecting processing executed by an image selection part of the detection part.
Figure 17:
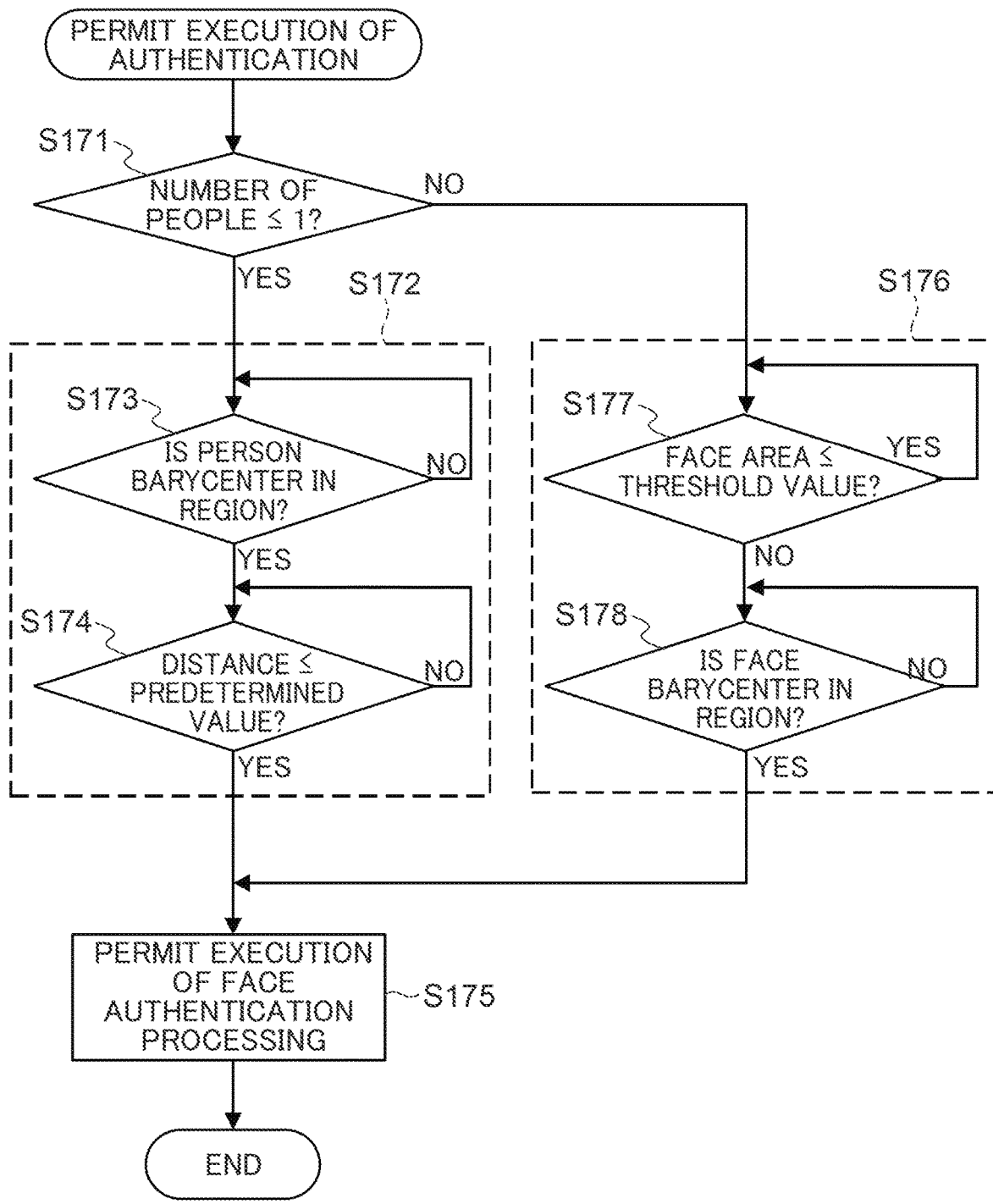
FIG. 17 is a flowchart showing face authentication permitting processing as a control method of the information processing apparatus according to the third embodiment of the present invention.

FIG. 16 is a flowchart showing picked-up image selecting processing executed by the image selection part 618 of the detection part 600. The present processing is performed when a program corresponding to the present processing stored in a ROM (not shown) of the detection part 600 is executed by the CPU 601. In FIG. 16, the CPU 601 determines whether or not the number of people in the imaging region A6 acquired by the human feature amount calculation part 616 is one or smaller (step S161). When it is determined that the number of people is one or smaller, the CPU 601 sets a picked-up image of the imaging region A6 to be used for the face authentication processing (step S162). In accordance with the above, before face authentication permitting processing of FIG. 17 described later is executed, the CPU 601 transmits image data subjected to image processing by the second camera preprocessing part 614 to the face region extraction part 620. When it is determined that the number of people is two or larger, the CPU 601 sets a picked-up image of the imaging region A5 to be used for the face authentication processing (step S163). In accordance with the above, before the face authentication permitting processing of FIG. 17 is executed, the CPU 601 transmits image data subjected to image processing by the first camera preprocessing part 613 to the face region extraction part 620. After the above, the present processing is finished. It should be noted that the CPU 601 may stop supplying power to the first camera 14 and the second camera 15 at a time point at which the first camera 14 or the second camera 15 no longer needs to perform imaging, so that power consumption is reduced.

FIG. 17 is a flowchart showing the face authentication permitting processing as a control method of the information processing apparatus according to the present embodiment. The present processing is performed when a program corresponding to the present processing stored in the ROM 112 is expanded in the RAM 111, and the CPU 601 executes the program. In FIG. 17, the CPU 601 first determines whether or not the number of people that exist in the imaging region A6 acquired by the human feature amount calculation part 616 is one or smaller (step S171).

When it is determined that the number of people is one or smaller, the CPU 601 executes the face authentication region determining processing of step S172. The face authentication region determining processing is processing for determining whether or not a person exists in the face authentication region A3 based on the person barycentric position acquired by the human feature amount calculation part 616, and the person distance acquired by the feature amount-distance conversion part 619. It should be noted that the face authentication region A3 in the present embodiment is the same as the face authentication region A3 in the first embodiment, and is included in the imaging region A6.

In the face authentication region determining processing of step S172, the CPU 601 first determines whether or not the person barycentric position exists in a region set in advance in a picked-up image (step S173). When the person barycentric position exists in the region set in advance, the CPU 601 then determines whether or not the person distance is a predetermined value or smaller (step S174). When the person barycentric position is in the region set in advance in the picked-up image and the person distance is the predetermined value or smaller, the CPU 601 determines that the person exists in the face authentication region A3, and the processing proceeds to step S175. In next step S175, the CPU 601 permits execution of the face authentication processing. When the person barycentric position does not exist in the region set in advance in the picked-up image, or when the person distance is not the predetermined value or smaller, the CPU 601 repeatedly executes step S173 or S174. It should be noted that conditions for determining whether or not a person exists in the face authentication region A3 in step S172 are not limited to the person barycentric position and the person distance. For example, whether or not a person exists in the face authentication region A3 may be determined based on an area of the person, a width of the person, and the like.

When it is determined that the number of people is two or larger in step S171, the CPU 601 executes authentication face image determining processing of step S176. The authentication face image determining processing is processing for determining whether or not any of a plurality of people who exist in the imaging region A6 looks into the display part 12 based on the face feature amounts acquired by the face feature amount calculation part 621. Specifically, the authentication face image determining processing is processing for determining whether an area of a face of any of the people who exist in the imaging region A6 is a threshold value set in advance or larger, and whether a barycentric position of the face exists in a predetermined area in the center of the imaging region A5.

In the authentication face image determining processing of step S176, the CPU 601 first determines whether or not an area of a face of a person who exists in the imaging region A5 is a threshold value set in advance or larger (step S177). Next, when the area of the face of the person is the threshold value set in advance or larger, the CPU 601 determines whether a barycentric position of the face of the person exists in a predetermined region in the center of the imaging region A5 (step S178). When the area of the face of the person that exists in the imaging region A5 is the threshold value set in advance or larger, and the barycentric position of the face of the person exists in the predetermined area in the center of the imaging region A5, it is considered that the person looks into the display part 12 in order to use the image forming apparatus 20. In view of the above, in this case, the CPU 601 determines that the person looks into the display part 12, and the processing proceeds to step S175. In next step S175, the CPU 601 permits execution of the face authentication processing. When the area of the face of the person that exists in the imaging region A5 is smaller than the threshold value set in advance, or when the barycentric position of the face of the person does not exist in the predetermined area in the center of the imaging region A5, the CPU 601 repeatedly executes step S177 or S178. It should be noted that conditions for determining whether or not a person looks into the display part 12 in step S176 are not limited to an area of a face of the person and a barycentric position of the face. For example, whether or not a person looks into the display part 12 may be determined based on a direction of a face of the person, a line of sight of the person, and the like. In the authentication face image determining processing of step S176, whether or not the person distance acquired by the feature amount-distance conversion part 619 is a predetermined value or smaller may be determined in addition to steps S177 and S178. When a plurality of people exists in the imaging region A5, the authentication face image determining processing of step S176 is executed for any of the people. Alternatively, the authentication face image determining processing of step S176 may be executed only for a person closest to the image forming apparatus 20. After the above, the present processing is finished.

When the number of people that exist in the imaging region A6 is one, a person who does not have an intention of using the image forming apparatus 20 is never erroneously determined as the user from among a plurality of people. Accordingly, when the number of people that exist in the imaging region A6 is one, execution of the face authentication processing is simply permitted only based on whether or not the person exists in the face authentication region A3 close to the image forming apparatus 20 in the face authentication permitting processing of FIG. 17. On the other hand, when the number of people that exist in the imaging region A6 is two or larger, there is possibility that a person who does not have an intention of using the image forming apparatus 20 is erroneously determined as the user from among a plurality of people. As described above, there is high possibility that a person who looks into the display part 12 is going to use the image forming apparatus 20. In view of the above, when the number of people that exist in the imaging region A6 is two or larger, execution of the face authentication processing is permitted based on whether or not the person looks into the display part 12, instead of whether or not the person exists in the face authentication region A3, in the face authentication permitting processing of FIG. 17. That is, a condition for permitting execution of the face authentication processing is changed in accordance with the number of people that exist in the imaging region A6. It should be noted that, in order to determine that a person looks into the display part 12, the person needs to be significantly close to the image forming apparatus 20. That is, a region in which a person looks into the display part 12 exists is considered to be smaller than the face authentication region A3.

According to the face authentication permitting processing of FIG. 17, a condition for permitting execution of the face authentication processing is changed in accordance with the number of people that exist in the imaging region A6. For example, when the number of people that exist in the imaging region A6 is one, a person who does not have an intention of using the image forming apparatus 20 is never erroneously determined as the user among a plurality of people. Accordingly, execution of the face authentication processing is permitted based only on whether or not the person exists in the face authentication region A3. On the other hand, when the number of people that exist in the imaging region A6 is two or larger, there is possibility that a person who does not have an intention of using the image forming apparatus 20 is erroneously determined as the user among a plurality of people. Accordingly, execution of the face authentication processing is permitted based on whether or not any person looks into the display part 12.

As described above, a region in which a person looks into the display part 12 exists is considered to be smaller than the face authentication region A3. Accordingly, execution of the face authentication processing in a case where the number of people that exist in the imaging region A6 is one is started earlier as compared with a case where the number of people that exist in the imaging region A6 is two or larger. As a result, when the number of people who exist in the imaging region A6 is one, the face authentication processing can be finished by the time the user arrives at the image forming apparatus 20, and the user can use the image forming apparatus 20 immediately. Accordingly, lowering convenience of the user can be prevented. On the other hand, when the number of people included in a surrounding image that has been picked up is two or larger, execution of the face authentication processing is permitted based on whether or not a person looks into the display part 12. In this manner, possibility that a person who does not have an intention of using the image forming apparatus 20 is erroneously determined as the user can be reduced. As described above, the face authentication permitting processing of FIG. 17 can prevent erroneous determination of the user, and also prevent lowering convenience of the user.

The above description has been made on the preferred embodiments of the present invention. However, the present invention is not limited to the embodiments described above, and a variety of variations and modifications can be made within a range of the gist of the present invention. For example, in the first to third embodiments described above, the description has been made on the case where the present invention is applied to the image forming apparatus. However, the application of the present invention is not limited to the image forming apparatus, and the present invention can be applied to almost any information processing apparatus that performs authentication processing, for example, a PC and a tablet. In the face authentication permitting processing of the first to third embodiments described above, the face authentication execution control part controls a timing of execution of the face authentication processing performed by the face authentication processing part. However, the face authentication execution control part may control a timing of transmitting an authentication result of the face authentication processing part to the CPU 110 without controlling a timing of execution of the face authentication processing performed by the face authentication processing part. In this case, the CPU 110 determines whether or not to permit the person to log in the image forming apparatus 10 based on the received authentication result. Accordingly, in this configuration as well, the face authentication function similar to that in the first to third embodiments can be performed.

In the first to third embodiments described above, the human detection sensor function of the image forming apparatus 10 is performed by the camera 11. However, the human detection sensor function may be performed by sensors, such as a pyroelectric sensor, an infrared reflection sensor, an infrared array sensor, an ultrasonic sensor, and the like which are provided separately from a camera. In this manner, power in the sleep mode of the image forming apparatus 10 can be reduced more than a manner in which the human detection sensor function is performed by the camera 11, which enables the person distance to be measured by using the human detection sensor. In this case, the detection part 300 can acquire the person distance by a simpler calculation than when the person distance is acquired by analyzing image data obtained from the camera.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-180189, filed Sep. 20, 2017, which is hereby incorporated by reference herein in its entirety.

What is claimed is:

1. An information processing apparatus comprising:
one or more memories storing one or more instructions; and
one or more processors which execute the one or more instructions and cause the information processing apparatus to:
access a surrounding image picked up by an imaging device;
execute authentication processing of a human included in the picked up surrounding image;
acquire the number of humans included in the picked up surrounding image; permit execution of the authentication processing in a state in which an authentication permission condition is satisfied for a human included in the picked up surrounding image; and change the authentication permission condition in accordance with the acquired number of humans,
wherein the authentication permission condition specifies how the authentication processing is carried out,
wherein, in a state in which the acquired number of humans is one, the authentication permission condition specifies that the authentication processing is carried out based on whether or not a human exists in a face authentication region in front of the information processing apparatus, and wherein, in a state in which the acquired number of humans is greater than one, the authentication permission condition specifies that the authentication processing is carried out based on whether or not a human looks into a display part of the information processing apparatus.

2. The information processing apparatus according to claim 1, wherein the authentication permission condition includes a condition relating to a distance between the human and the information processing apparatus.

3. The information processing apparatus according to claim 1, wherein the authentication permission condition includes a condition relating to a position of a face of the human in the image.

4. The information processing apparatus according to claim 1, wherein the authentication permission condition includes a condition relating to an area of a face of the human in the image.

5. The information processing apparatus according to claim 1, further comprising a display device configured to display a human included in the surrounding image that has been picked up,
   wherein said display device is configured to display a message prompting a user to adjust a position of the displayed human.

6. An information processing apparatus comprising:
   one or more memories storing one or more instructions: and
   one or more processors which execute the one or more instructions and cause the information processing apparatus to:
   acquire the number of humans existing in a first region around the information processing apparatus:
   perform face authentication processing of a human existing in a second region smaller than the first region; and
   perform login to the information processing apparatus for a human authenticated by the face authentication processing, at least in a state in which a size of the second region is or has changed in accordance with the acquired number of humans.

7. The information processing apparatus according to claim 6, wherein the one or more processors execute the one or more instructions and cause the information processing apparatus to make the second region larger in a state in which the acquired number of humans is one, as compared to a state in which the acquired number of humans is two or more.

8. An information processing apparatus comprising:
   one or more memories storing one or more instructions: and
   one or more processors which execute the one or more instructions and cause the information processing apparatus to:
   perform face authentication processing of a human included in an image of a first region around the information processing apparatus: and
   perform login to the information processing apparatus for a human authenticated by the face authentication processing in a state in which the authenticated human enters a second region around the information processing apparatus, the second region smaller than the first region
   wherein the one or more processors acquire the number of humans existing around the information processing apparatus, and perform the login at least in a state in which the one or more processors change or have changed a size of the second region in accordance with the acquired number of humans.

9. The information processing apparatus according to claim 8, wherein the one or more processors execute the one or more instructions and cause the information processing apparatus to make the second region larger in a state in which the acquired number of humans is one, as compared to a state in which the acquired number of humans is two or more.

10. A control method executed by an information processing apparatus, the control method comprising:
    an acquiring step of acquiring the number of humans existing in a first region around the information processing apparatus:
    an authenticating step of performing face authentication processing of a human existing in a second region smaller than the first region; and
    a login step of performing login to the information processing apparatus for a human authenticated by the face authentication processing, at least in a state in which a size of the second region is or has changed in accordance with the number of humans acquired by said acquiring step.

11. The control method of an information processing apparatus according to claim 10, wherein the second region is made larger in a state in which the acquired number of humans is one, as compared to a state in which the acquired number of humans is two or more.

12. A control method executed by an information processing apparatus, the control method comprising:
    an authenticating step of performing face authentication processing of a human included in an image of a first region around the information processing apparatus: and
    a login step of performing login to the information processing apparatus for a human authenticated by the face authentication processing in a state in which the authenticated human enters a second region around the information processing apparatus, the second region smaller than the first region,
    wherein the number of humans existing around the information processing apparatus is acquired, and the login is performed at least in a state in which a size of the second region is or has changed in accordance with the acquired number of humans.

13. The control method of an information processing apparatus according to claim 12, wherein the second region is made larger in a state in which the acquired number of humans is one, as compared to a state in which the acquired number of humans is two or more.

* * * * *